June 12, 1962 G. A. WALTERS ET AL 3,039,079
SCANNING SONAR

Filed May 29, 1956 9 Sheets-Sheet 1

INVENTORS
GLENN A. WALTERS
JOHN B. DAMONTE
BY Lippincott + Smith

ATTORNEYS

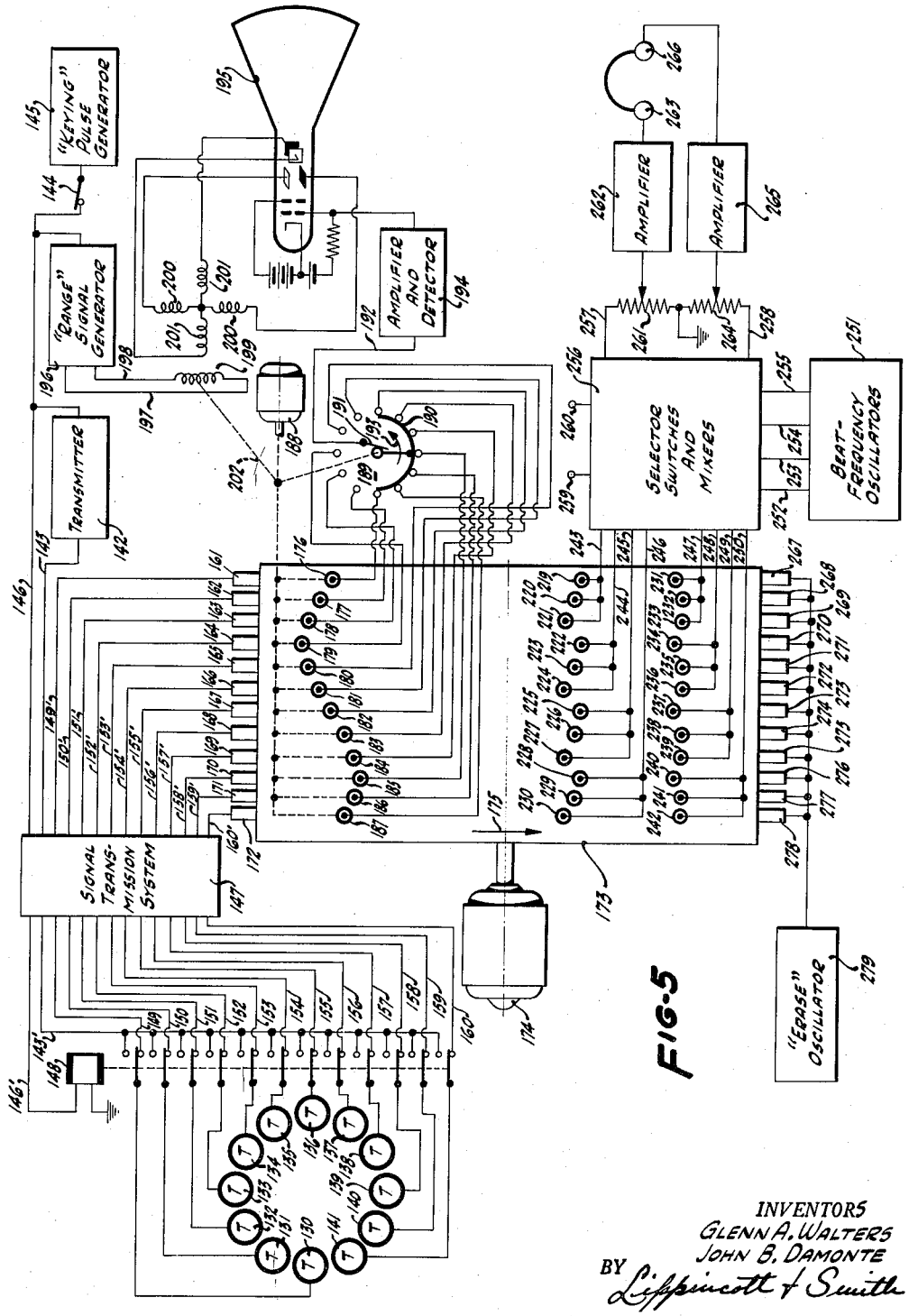

June 12, 1962 G. A. WALTERS ET AL 3,039,079
SCANNING SONAR

Filed May 29, 1956 9 Sheets-Sheet 5

INVENTORS
GLENN A. WALTERS
JOHN B. DAMONTE
BY
Lippincott + Smith

ATTORNEYS

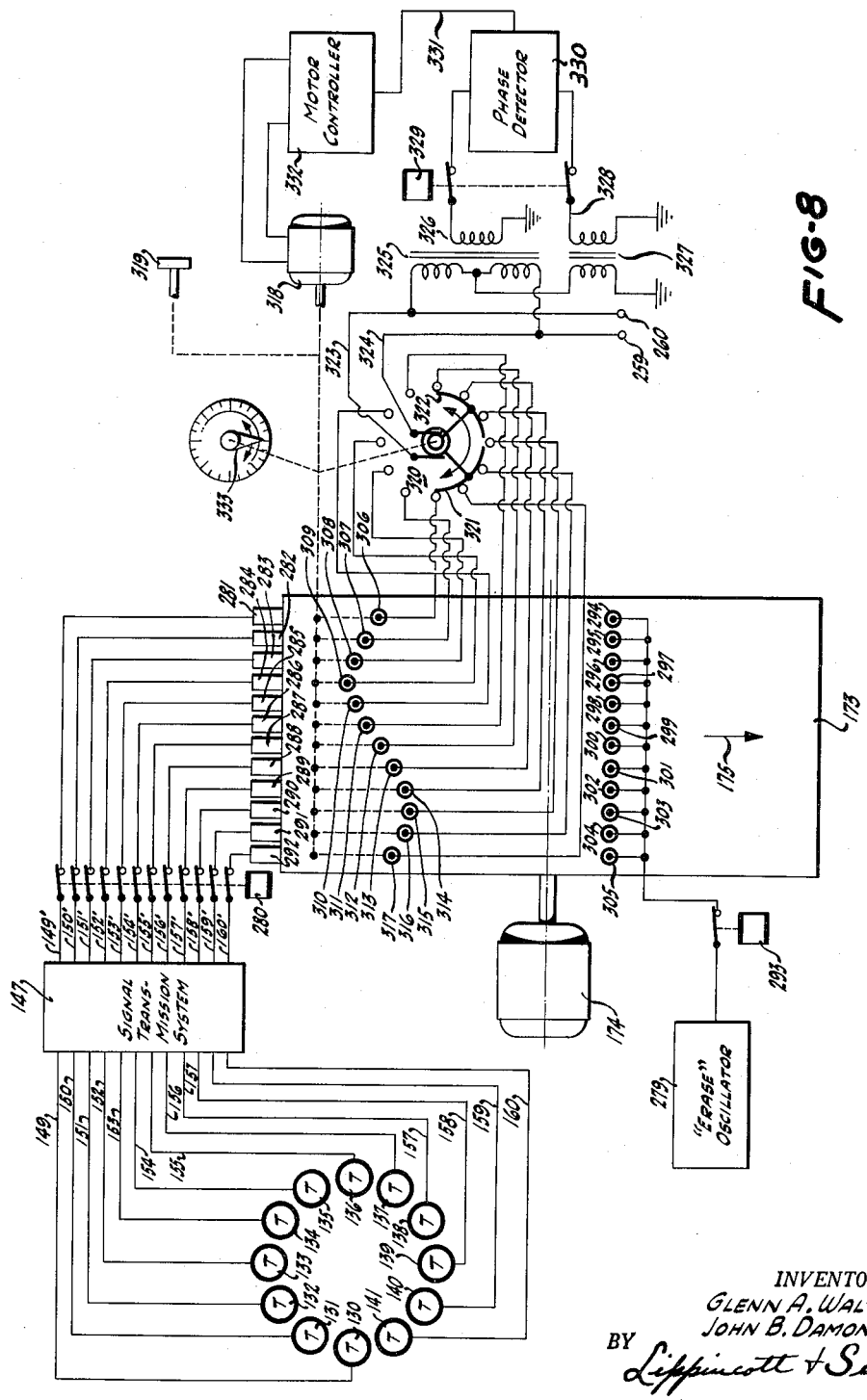

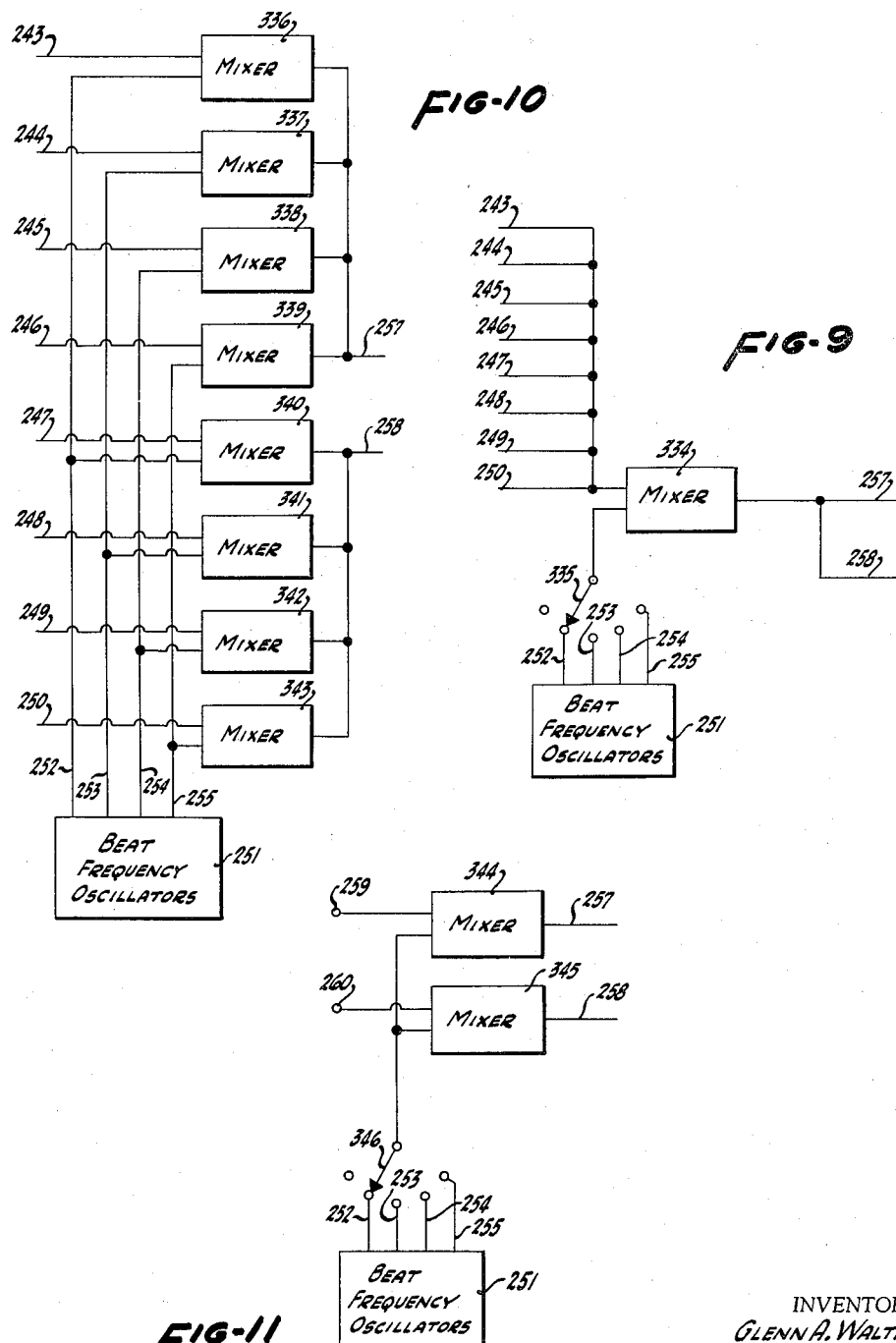

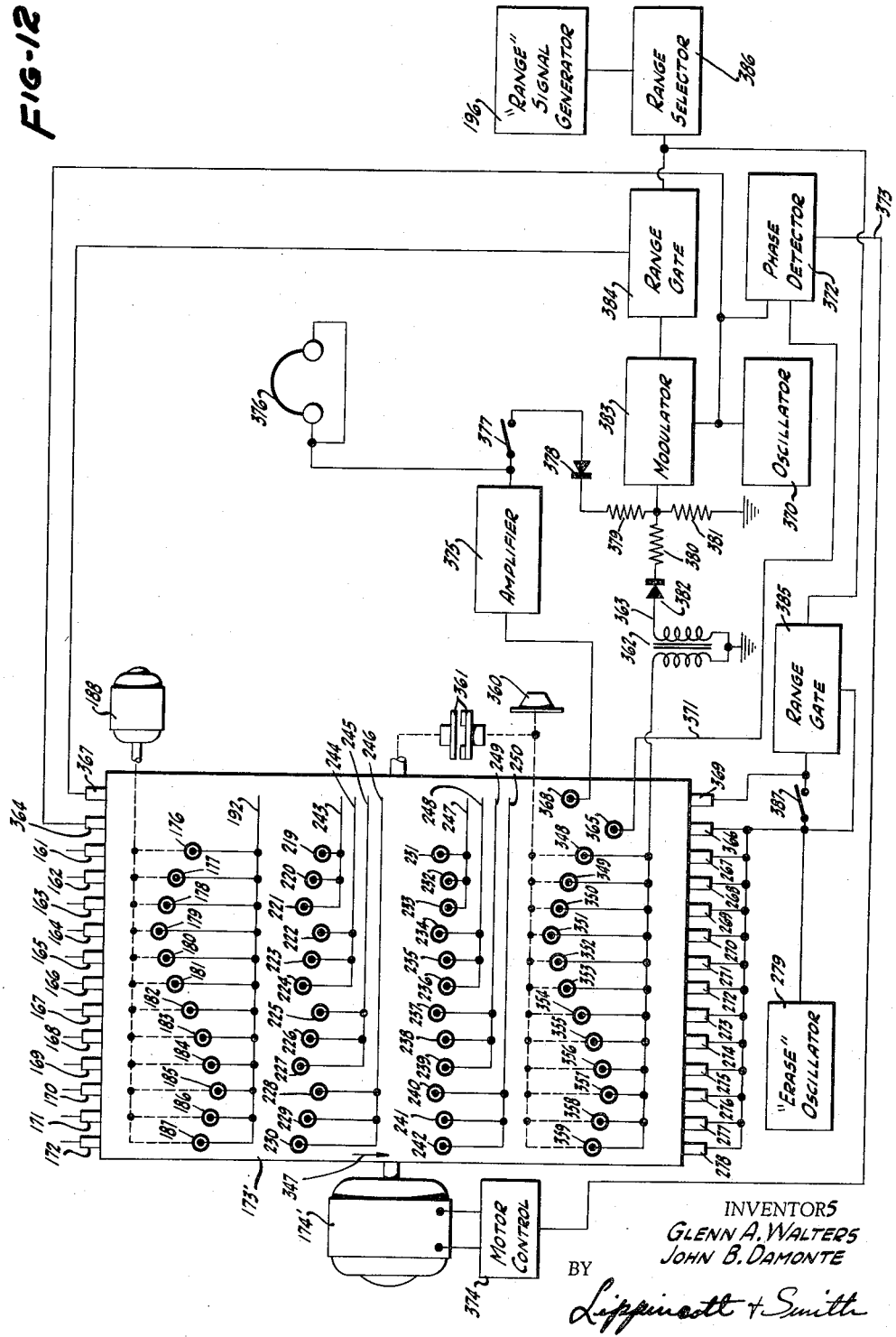

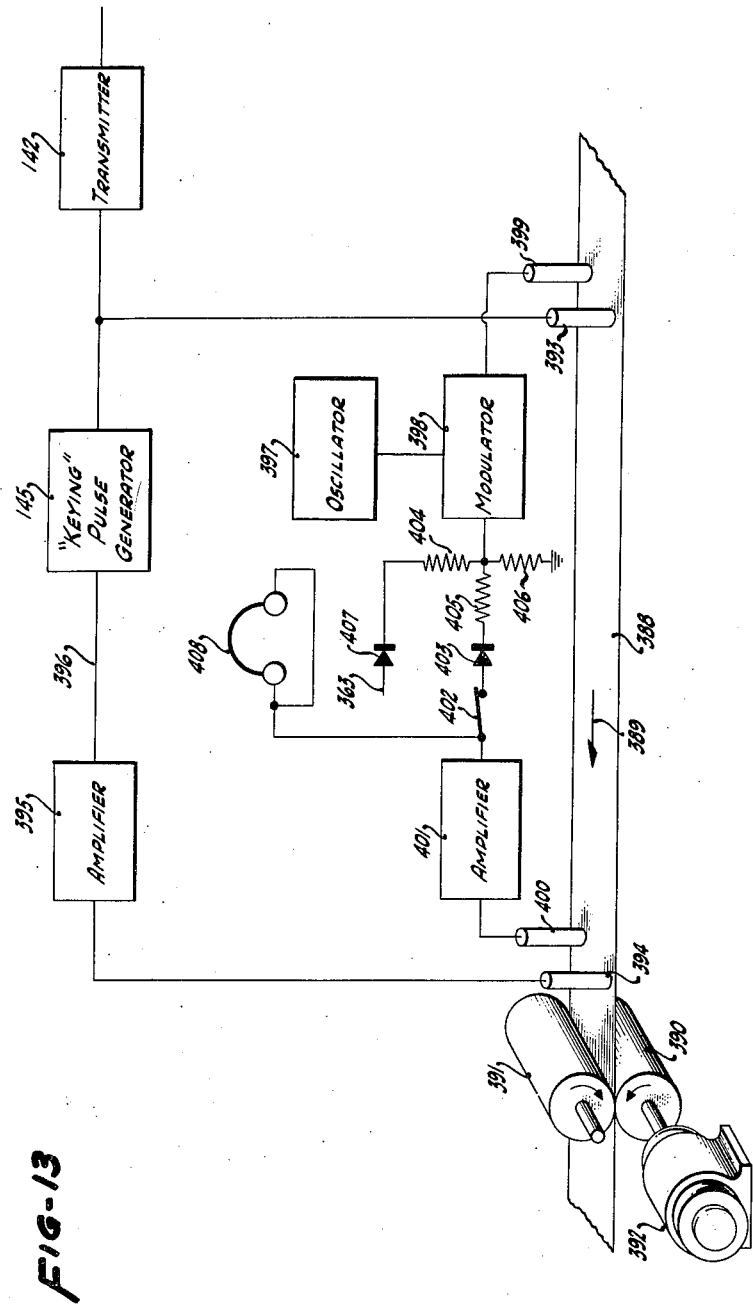

3,039,079
SCANNING SONAR
Glenn A. Walters, Atherton, and John B. Damonte, San Francisco, Calif., assignors to Textron, Inc., a corporation of Rhode Island
Filed May 29, 1956, Ser. No. 588,015
16 Claims. (Cl. 340—6)

This invention relates to sonar apparatus for locating underwater objects, and in particular to sonar apparatus having improved scanning facilities for detecting the presence of underwater objects and for determining their azimuth directions.

In sonar apparatus for locating underwater objects, sonic or ultrasonic waves in water originating at or reflected from an underwater object are received by one or more underwater electro-acoustic transducers and are converted into electric signals. These electric signals may be converted into sound waves in air (by earphones, for example) that can be heard by the operator; or they may be displayed in various ways on the screen of a cathode-ray tube or the like, or recorded on a chart, for visual observation. In a passive sonar, the received waves are sounds originating at the underwater object, such as engine noise, sonic or ultrasonic waves produced by movement of the object through the water, and the like. In an active sonar, bursts of sonic waves are transmitted by the sonar apparatus and echoes or reflections from underwater objects are received. The present invention is useful in both active and passive sonar operation.

To determine the azimuth direction of an underwater object from the sonar transducers, some kind of directional scanning is usually required for measuring the direction of travel of the received sonic waves. Mechanical rotation of a directional transducer or transducer array is generally unsatisfactory for several reasons, among which are noises generated by such rotation and severe limitations upon the scanning rate. Consequently, non-rotative transducer arrays have been devised, with electrical scanning means for combining the electric signals from the transducers in such a way that the azimuth direction for maximum response to received sonic waves is rotated or scanned through 360 degrees or some desired fraction thereof. However, for reasons hereinafter discussed, prior electrical scanning means for sonar receivers have many disadvantageous limitations. Accordingly, a general object of this invention is to provide an improved scanning sonar.

At a given frequency, a transducer array that provides a plurality of electric signals responsive to a received sonic wave can be made directional by shifting the phase relations of the electric signals so that all or a selected plurality of such electric signals are placed in phase coincidence only for received waves traveling in a selected direction, called the search or scanning direction. By varying the relative electrical phase shifts, the direction for maximum response can be varied for scanning purposes. However, if conventional phase-shifting networks are employed in the scanning system, an adjustment that is correct for one frequency will be incorrect for another frequency, since the phase relations of the electric signals provided by the array vary with the wavelength of the received wave. This fact complicates the problem encountered in electrical scanning with active sonar systems wherein different frequencies are transmitted selectively at different times, and produces even greater complications in passive sonar operations where the received waves may have any frequency, the value of which is not known prior to detection. Accordingly, another object of this invention is to provide in a sonar system improved electrical scanning apparatus that operates in a manner independent of the sonic wavelength, so that no readjustment of the scanning apparatus is required for detecting sonic and ultrasonic waves of different frequencies.

Furthermore, a directional array generally has a directional pattern including a major lobe alined with the desired azimuth search direction and a plurality of minor lobes alined with other azimuth directions. The minor lobes tend to produce false directional information and therefore are undesirable. Another object of this invention is to provide a scanning sonar having improved means for suppressing or reducing the minor lobes of the directional pattern.

If the search direction is continuously rotated in a horizontal plane, a continuous 360 degree search program is provided for detecting underwater objects situated in any azimuth direction. If the search direction is oscillated within an angle smaller than 360 degrees, a sector scan is provided for more intensively searching for underwater objects within the selected sector. If the search direction is fixed at a selected azimuth angle, a "searchlight" function is provided for making a still more intensive search in the selected direction. If a sonic wave is received and the search directions is oscillated to modulate the intensity of the received signal for pinpointing or following the underwater object, a tracking function is provided. Similarly, certain ranges as well as certain directions may be selected for more intensive searching.

Thus, by appropriate control of the scanning program, a considerable number of different search and tracking functions can be provided. These different functions or programs are complementary, in that objects may be located by one search program that would not be detected by another. Heretofore, scanning sonar apparatus has been generally capable of only one search or tracking function at a time. In other words, a 360 degree search could not be performed simultaneously with a sector scan, a "searchlight" function or a tracking function. Accordingly, another object of this invention is to provide an improved scanning sonar that can perform a plurality of search and tracking functions, simultaneously or sequentially, as desired.

In the case of a small or distant underwater object, the weak echoes received from such an object may be masked by noise or random sonic waves. Another object of this invention is to provide improved means based upon coherence techniques for amplifying such weak echoes relative to the noise so that the underwater object can be detected and located.

Various types of presentation may be employed for presenting the received information to the sonar operator or operators. For example electric signals from the transducers, appropriately modified and combined by the scanning system, may be supplied to a cathode-ray tube that provides a PPI type presentation, which is a map-like display wherein each underwater object appears as a bright spot on the phosphor screen of a cathode-ray tube, with each spot correctly located on the screen to represent the azimuth direction and the range of an underwater object. Binaural presentations may be provided by supplying a selected one or a selected plurality of the signals to one phone of an operator's headset while another selective one or selected plurality of the signals is supplied to the other phone of the same headset. Multi-tone binaural presentations may be provided by modulating the signals from diametric azimuth sectors with different audio tones.

Servo mechanisms may be provided for automatic tracking. It is desirable that several types of presentation, a visual presentation and an aural presentation, for example, be provided simultaneously, since signals that may escape detection in one type of presentation may be detected more easily in another type of presentation. Another object of this invention is to provide a scanning sonar wherein a plurality of different presentations, of the same or different search and tracking functions, may be provided simultaneously for use by one or several sonar operators.

In an air-towed (moving) or in a dunking (stationary) sonar, the sonar transducers are mounted in a submerged assembly towed or suspended in the water and attached by a cable to a helicopter, blimp, or other aircraft. It is desirable that the amount of equipment mounted in this submerged assembly, and the power requirements thereof, be as small as is reasonably practicable. Another object of this invention is to provide sonar apparatus having improved directional scanning facilities in which the scanning apparatus can be located remotely from the transducers (in the aircraft, for example) so that the amount of equipment carried by the submerged assembly can be minimized.

Briefly stated, in accordance with certain aspects of this invention whereby the foregoing and other objects and advantages are achieved, a circular array of electro-acoustic transducers is submerged in the water for converting each received sonic or ultrasonic wave into a plurality of electric signals. For example, twelve transducers may be equally spaced around a horizontal circle. Because of the circular configuration of the array, the peaks or high-pressure planes of sonic waves received from any azimuth direction reach different ones of the transducers at different times, and the electric signals provided by respective ones of the transducers are in generally non-coincident phase relation with one another.

The phase relations of the twelve electric signals depends on the direction of travel of the received sonic waves: that is, a sonic wave arriving from any one azimuth direction produces a phase relation of the electric signals that is different from the phase relation produced by a sonic wave arriving from any other azimuth direction. Therefore, at a given frequency, the amount of differential phase shift required to bring a selected plurality of the twelve electric signals into phase coincidence is a measure of the direction of travel of a received sonic wave.

For sonic waves traveling in any selected azimuth direction, the amount of differential phase shift required to bring a selected plurality of the twelve electric signals into phase coincidence depends upon the frequency of the received sonic wave, because the wavelength of the sonic wave is inversely related to its frequency. However, the peaks of the twelve electric signals have time relations that depend only upon the configuration of the transducer array, the direction of travel of the received sonic wave, and the velocity of sound. Therefore, the time relations of the electric signals are substantially independent of the frequency of the received sonic wave. Accordingly, in contrast to prior electrically scanned sonar apparatus, the present invention provides for bringing selected ones of the twelve electric signals into phase coincidence by means of differential time delays providing amounts of differential phase shift that vary with frequency, rather than by fixed amounts of differential phase shift.

The scanning mechanism, which may be located at a place remote from the transducers, includes a recording device whereby the twelve electric signals are recorded separately, and are reproduced with differential time delays suitable for performing various search and tracking functions. In a preferred embodiment, the recording device is a multi-channel magnetic recorder that records the twelve electric signals separately in twelve side-by-side recording tracks on a continuously rotating magnetic drum or the like. A plurality of pick-up heads are provided in the magnetic recorder for reproducing the twelve recorded signals. Between the recording and reproduction of each signal there is a time delay that depends upon the peripheral speed of the magnetic drum and the spacing between the recording and pick-up heads. By making the spacing between the recording and pickup heads different for different ones of the recorded signals, the time relations of the reproduced signals can be made to differ in any desired manner from the time relations of the recorded signals. Consequently, the pick-up heads can be so arranged relative to the recording heads that any selected plurality of the reproduced signals will be in phase coincidence whenever a sonic wave is received from any selected azimuth direction.

Various different arrangements of the magnetic recorder pick-up heads can be used to provide different search and tracking functions useful in underwater object location. For example, eight sets of pick-up heads may be so arranged that each set provides a plurality of electric signals in phase coincidence responsive to sonic waves received from a respective one of eight different semi-quadrants of azimuth direction. These signals may be combined in various ways to provide an omnidirectional aural presentation, a simple binaural presentation, a multi-tone binaural presentation, or various other presentations, aural and visual, separately or at the same time. A row of twelve pick-up heads can be connected to a mechanical drive that periodically changes their relative positions to provide a continuous 360 degree search program. Another row has pick-up heads that can be positioned relative to one another by a servomechanism responsive to phase differences in the reproduced voltages to provide automatic tracking of moving underwater objects. With a sufficient number of pick-up heads, all or any selected ones of these and other search functions can be provided simultaneously.

To improve the signal-to-noise ratio for detecting weak echoes from small or distant underwater objects, advantage is taken of the fact that echoes are synchronized or coherent with respect to the sonic waves transmitted by the sonar apparatus, while noise is not. Through multiple recording on the same or different recording tracks the amplitude of the coherent signals is built up more rapidly than the amplitude of noise, so that the desired signals or echoes can be detected.

The invention will be better understood from the following detailed description of illustrative embodiments taken in connection with the accompanying drawings, and its scope is pointed out in the appended claims. In the drawings:

FIG. 5 is a schematic diagram of another sonar apparatus having scanning facilities for a continuous 360 degree azimuth search and other search functions, with simultaneous visual and aural presentations;

FIG. 8 is a schematic diagram of sonar apparatus having automatic tracking facilities;

FIG. 9 is a schematic circuit diagram of connections that can be made by the selector switches in the FIG. 5 apparatus for omnidirectional listening;

FIG. 10 is a schematic circuit diagram of connections that can be made by the same selector switches for multi-tone binaural listening;

FIG. 11 is a schematic circuit diagram of connections that can be made by the same selector switches for binaural tracking;

FIG. 12 is a fragmentary schematic diagram of apparatus for increasing the signal-to-noise ratio by coherence techniques; and FIG. 13 is a fragmentary schematic diagram of other apparatus for increasing the signal-to-noise ratio by coherence techniques.

Figure 1:
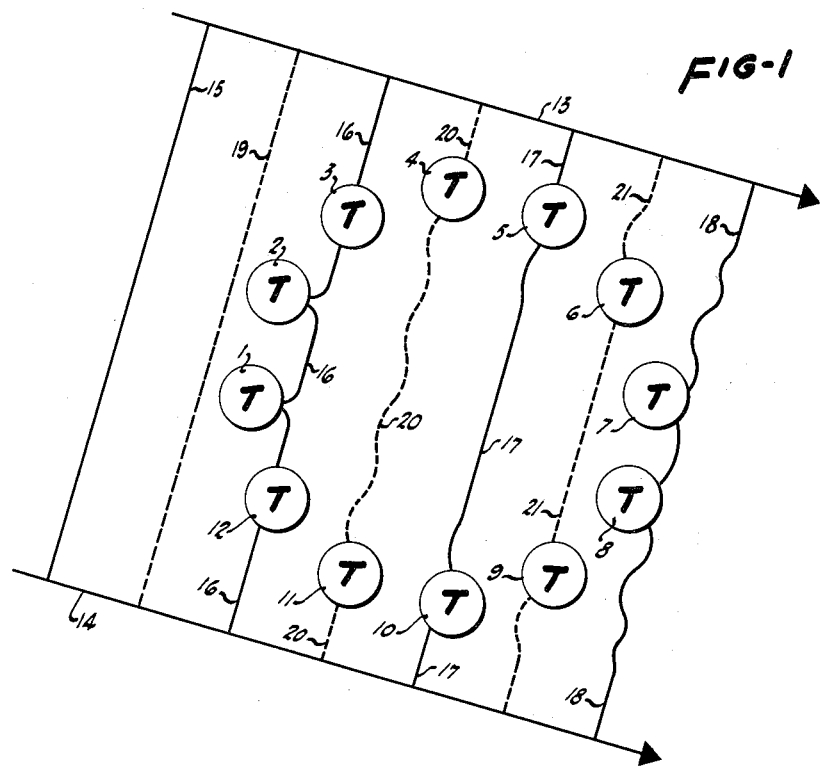
FIG. 1 is a schematic representation of a circular array of electro-acoustic transducers and a received sonic wave.

Referring now to FIG. 1 of the drawings, a circular array of electro-acoustic transducers consists of twelve transducers, identified in the drawing by the reference numerals 1 through 12, equally spaced around a horizontal circle. A larger or a smaller number of transducers may be provided, if desired. A received sonic wave, originating at or reflected from an underwater object, is traveling in the direction represented by arrows 13 and 14. Peaks or high-pressure planes of the sonic wave are represented by solid lines 15 through 18, while troughs or low-pressure planes of the sonic wave are represented by broken lines 19 through 21. Because of the circular conformation of the array, it will be noted that each peak or high-pressure plane of the sonic wave arrives at different ones of the twelve transducers at different times.

Transducers 1 through 12 may each be a conventional electro-acoustic transducer of a type commonly employed in sonar apparatus. Responsive to each sonic wave received, each of the twelve transducers provides an electric signal. Because peaks or high-pressure planes of the received sonic waves reach different ones of the twelve transducers at different times, the twelve electric signals provided by the transducers are not all in phase coincidence with one another.

Figure 2:
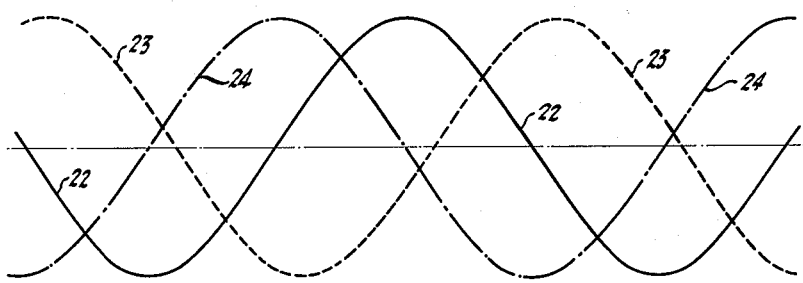
FIG. 2 is a group of curves showing the phase relations of certain electric signals provided by respective ones of the transducers shown in FIG. 1.

FIG. 2 represents the phase relations of several electric signals produced by respective ones of the transducers responsive to the received sonic wave represented in FIG. 1. Curve 22 represents the phase of electric signals produced by transducers 1 and 2, curve 23 represents the phase of electric signals produced by transducers 3 and 12, and curve 24 represents the phase of electric signals produced by transducers 4 and 11. It will be noted that the peaks of curve 23 are later in time than the peaks of curve 22 by an amount equal to the time required for the sonic wave to travel between a vertical plane through the centers of transducers 1 and 2 and a vertical plane through the centers of transducers 3 and 12. Similarly, the peaks of curve 24 are later in time than the peaks of curve 23 by an amount equal the time required for the sonic wave to travel between a vertical plane through the centers of transducers 3 and 12 and a vertical plane through the centers of transducers 4 and 11. Other electric signals, produced by transducers 5 through 10, could be represented by additional curves spaced in time behind curve 24.

The time relations illustrated in FIG. 2 are produced by any received sonic wave traveling in the direction represented by arrows 13 and 14 of FIG. 1. Any received sonic wave traveling in any other azimuth direction will produce a different time relation of the electric signals. Consequently, the time relations of the electric signals supplied by transducers 1 through 12 represent the direction of travel of the received sonic wave, and therefore are indicative of the azimuth direction from the transducer array of an underwater sound source or sound reflector. It is noteworthy that the time relation of the electric signals for sonic waves traveling in any selected direction depends upon the geometry of the transducer array and the velocity of sound only, and is substantially independent of frequency, while the phase relation of the same signals is highly frequency dependent.

If the six electric signals represented by curves 22, 23 and 24 were immediately added together, the signals would tend to cancel one another to a considerable extent because of their phase differences, and the sum signal would be of relatively small amplitude.

Assume that the electric signals provided by transducers 3 and 12 are delayed by an amount equal to the time interval between a peak of curve 23 and the following peak of curve 24, and that the electric signals provided by transducers 1 and 2 are delayed by an amount equal to the time interval between a peak of curve 22 and the following peak of curve 24. Now the six electric signals are in phase coincidence, and if they are added together a sum signal of maximum amplitude will be obtained. Consequently, the direction of travel of the received sonic wave can be determined by measuring the amount of time delay that must be applied to selected ones of the electric signals to produce a sum signal of maximum amplitude.

In the case of a received sonic wave traveling in the direction represented by arrows 13 and 14, the electric signals produced by transducers 5 through 10 were not considered, since these transducers are partially masked by the transducers on the other side of the circular array, and the wavefronts of the waves received by transducers 5 through 10 are distorted by the shadows of the other transducers, as is shown in FIG. 1. To detect a wave traveling in the direction opposite to that indicated by arrows 13 and 14, in the electric signals provided by transducers 5 through 10 would be appropriately delayed and added together, while the signals provided by the other six transducers preferably would be neglected.

Figure 3:
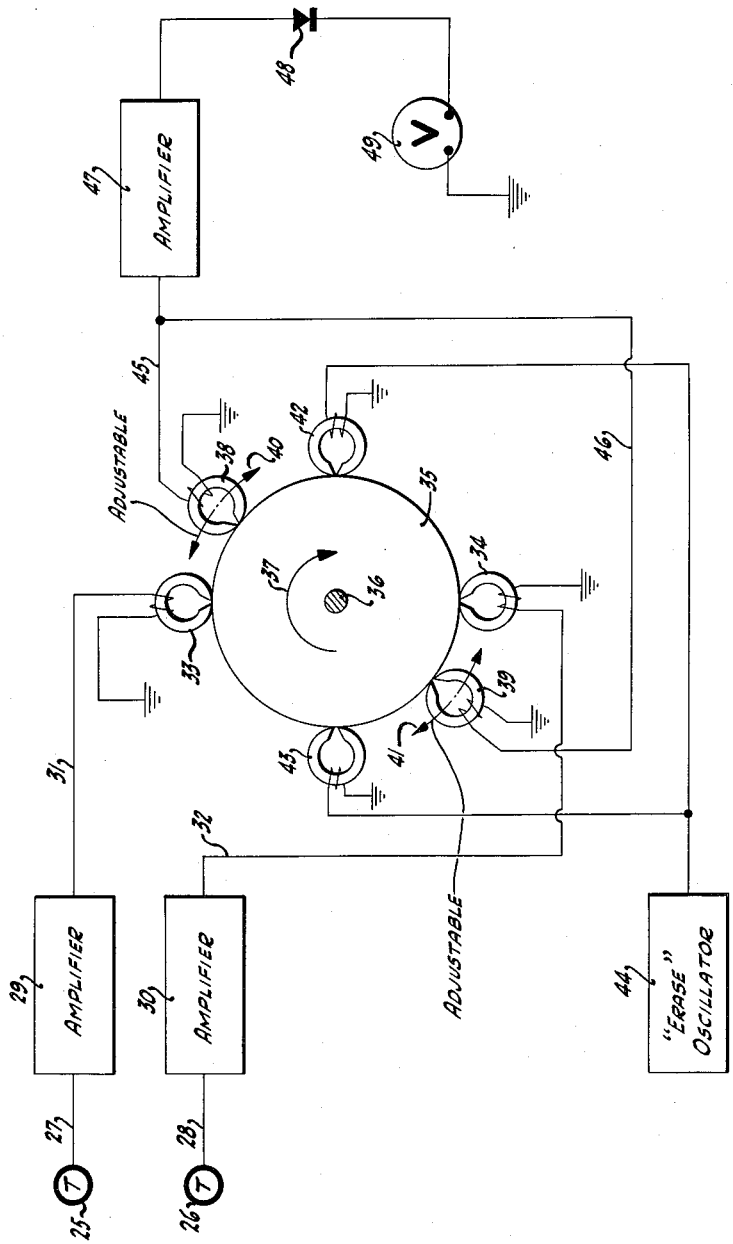
FIG. 3 is a schematic diagram of a magnetic recorder for altering the time and phase relations of two electric signals.

For producing the relative time delays needed to bring a selected plurality of the electric signals into phase coincidence, a multi-channel magnetic recorder preferably is employed. FIG. 3 illustrates how a magnetic recorder may be used to change the time and phase relations of two electric signals.

Referring now to FIG. 3, assume that two electro-acoustic transducers 25 and 26 supply to leads 27 and 28, respectively, two electric signals responsive to a received sonic wave. If peaks of the sonic wave reach transducers 25 and 26 simultaneously, the two electric signals provided in leads 27 and 28 will be in phase coincidence; otherwise, they will be out-of-phase. The two electric signals are amplified by conventional amplifiers 29 and 30, and the two amplified signals are supplied through leads 31 and 32 to two recording heads 33 and 34 of a multi-channel magnetic recorder. The magnetic recorder may include a magnetic recording drum 35 that is rotated on a shaft 36 at a constant angular velocity in a clockwise direction as indicated by arrow 37. Any suitable driving means may be provided for rotating drum 35 at constant speed. Means for the accurate control of drum speed of the magnetic recorder are well known to those skilled in the art.

The magnetic recorder has two pick-up or reproducing heads 38 and 39 adjustably spaced from recording heads 33 and 34, as indicated by double-headed arrows 40 and 41. Two erasing heads 42 and 43 are supplied with high frequency current by "erase" oscillator 44 for erasing the previously recorded signals. As drum 35 rotates, the signal recorded on the surface of the drum by recording head 33 is reproduced by pick-up head 38 and then erased by erasing head 42, and the signal recorded on the surface of the drum by recording head 34 is reproduced by pick-up head 39 and is erased by erasing head 43. Except for the adjustment and differential spacings of the pick-up heads relative to the recording heads, hereinafter more fully described, the magnetic recorder operates in the same manner as any conventional drum-type multi-channel magnetic recorder. The reproduced electric signals are transmitted through leads 45 and 46, added together, amplified by a conventional amplifier 47, detected by a half-wave rectifier 48 or any other suitable detector, and measured by a voltmeter 49.

The reproduced signal provided by pick-up head 38 is delayed with respect to the signal recorded by recording head 33 by the amount of time required for the drum surface to travel through a distance equal to the spacing between heads 33 and 38. For example, drum 35 may be about six inches in diameter and may rotate at a speed of 2400 revolutions per minute. The surface of the drum then moves at a speed of about 754 inches per second, and the reproduced signal is delayed by about 1.3 milliseconds for each inch of spacing between recording head 33 and pick-up head 38. Assume that the recorded signal has a frequency of 10 kilocycles per second. Then the wavelength of the recorded signal on the surface of the drum is approximately 75.4 mils, and a change of 1 mil in the spacing between heads 33 and 38 will produce a phase shift of 4.8 degrees in the reproduced signal. If the recorded signal has a frequency of 14 kilocycles per second, a 1 mil change in the spacing between the heads will produce a phase shift of 6.7 degrees in the reproduced signal. Similarly, the reproduced signal provided by pick-up head 39 is delayed with respect to the signal recorded by recording head 34 by an amount proportional to the spacing between heads 34 and 39.

With respect to the present invention, the absolute magnitude of time delay between the recorded and the reproduced signals is unimportant provided that it is reasonably small, as it will be in all cases with the apparatus described since a complete revolution of the drum occurs in only one-fortieth of a second. What is important is the differential time delay among a plurality of the reproduced signals. For example, assume that the spacing between heads 39 and 34 is precisely the same as the spacing between heads 38 and 33. In this case both reproduced signals are delayed by precisely the same amount, and the reproduced signals will be in phase coincidence only if the two recorded signals are in phase coincidence. If the two recorded signals are not in phase coincidence, the two reproduced signals can be brought into phase coincidence by moving one or the other of the two pick-up heads 38 and 39 to provide a differential time delay between the two reproduced signals. Phase coincidence of the two reproduced signals is indicated by a maximum reading of voltmeter 49, and phase opposition of the two reproduced signals is indicated by a minimum reading of voltmeter 49.

Now assume that peaks of a received sonic wave arrive simultaneously at transducers 25 and 26. The two recorded signals will be in phase, and the two reproduced signals will also be in phase, provided that the spacing between heads 34 and 39 is precisely equal to the spacing between heads 33 and 38, or differs therefrom by an integral number of wavelengths of the signals recorded on the drum surface. If peaks of the received sonic wave arrive at transducers 25 and 26 at different times, the recorded signals will, in general, not be in phase coincidence, and neither will the reproduced signals unless the pick-up heads are adjusted to give a differential time delay that compensates for the time delay between the arrival of sonic wave peaks at the two transducers.

From the foregoing it will be apparent that, for any given adjustment of the two pick-up heads, a maximum reading of voltmeter 29 is produced only by received sonic waves traveling in certain selected directions, and that the selected directions can be changed by readjusting the relative positions of the pick-up heads. In principle, multi-channel recorders having signal-storage elements other than a magnetic drum may be employed, such as magnetic tape recorders, recorders having dielectric storage elements, etc., but the magnetic drum recorder is the most suitable type available at present.

It should be noted that there is an important difference between the time-delay system herein described for bringing two signals into phase coincidence and a phase-shift system for bringing signals into coincidence, in that the time-delay system, when applied to a sonar scanning system as exemplified by the apparatus illustrated in FIGURE 3, is substantially independent of frequency while a phase-shift system would be highly frequency dependent.

Assume, for example, that a received sonic wave is traveling in a direction that is not perpendicular to a plane through the centers of transducers 25 and 26, so that peaks of the sonic wave reach the two transducers at different times. The time delay between peaks of the two electric signals provided by the two transducers depends only upon the velocity of sound, the direction of travel of the received wave, and the spacing between the two transducers. Therefore, the time delay between the two electric signals will be substantially the same for a received signal having a frequency of 14 kilocycles per second as for a received signal having a frequency of 10 kilocycles per second, for example, but the phase relation of the signals in the two cases, will, in general not be the same because of the difference in wavelengths.

Therefore, a simple phase-shifting network adjusted to bring the two electric signals into phase coincidence at 10 kilocycles would not bring the two signals into coincidence at 14 kilocycles, or, in general, at any frequency other than the frequency for which the network was adjusted. On the other hand, the magnetic recorder time-delay scanning system brings the reproduced signals into phase coincidence for any selected time delay between sonic wave peaks arriving at the two transducers, so that the direction of maximum response of the system is substantially independent of the frequency of the received sonic waves.

The simple apparatus shown in FIG. 3 is not adequate for a 360 degree scanning sonar. For example, received sonic waves traveling from left-to-right would produce the same response as received sonic waves traveling from right-to-left. A more elaborate and more useful scanning system is illustrated in FIG. 4.

Figure 4:
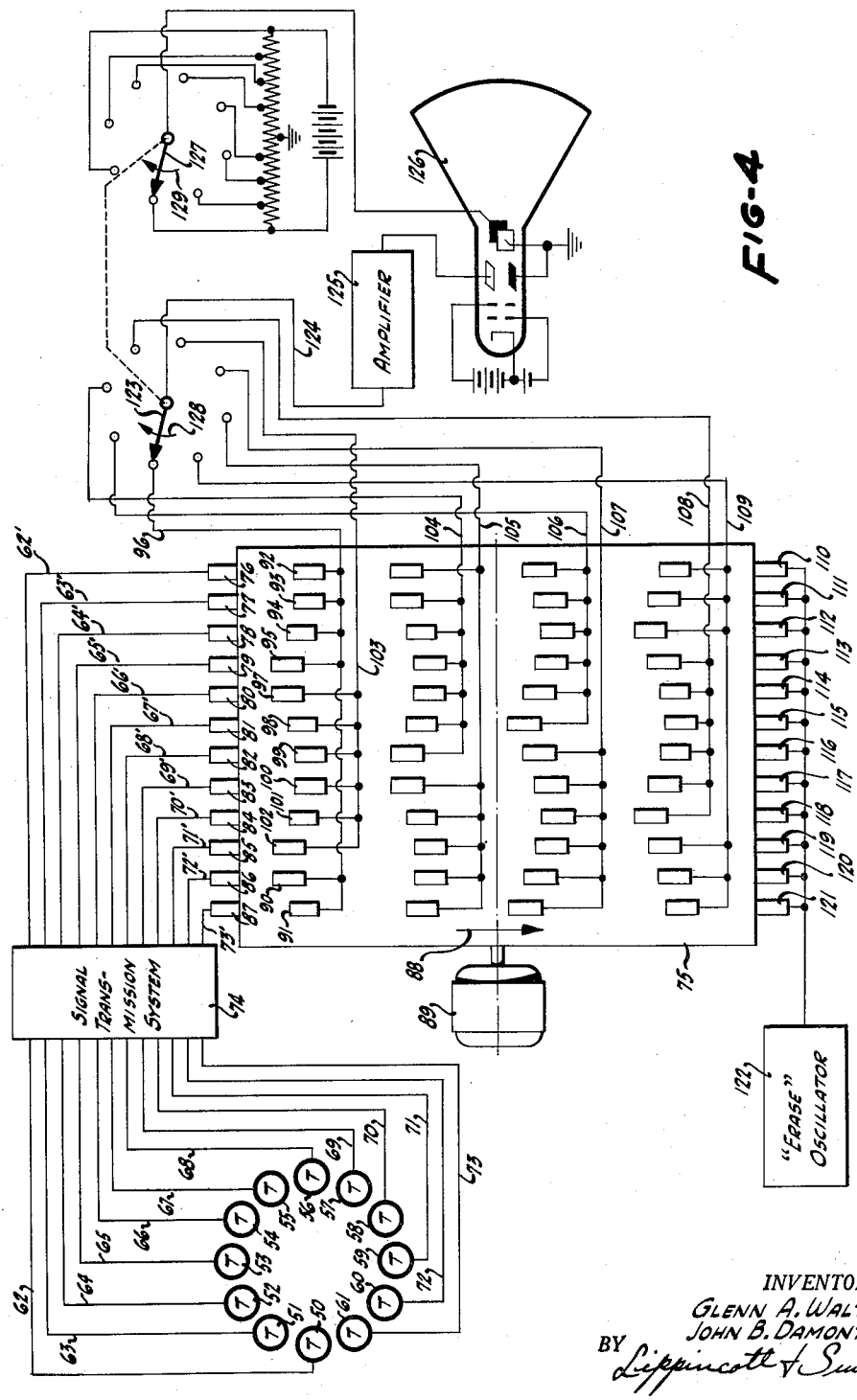
FIG. 4 is a schematic diagram of sonar apparatus having directional scanning facilities including a magnetic recorder.

Referring now to FIG. 4, twelve electro-acoustic transducers, identified in the drawing by reference numerals 50 through 61, are equally spaced around a horizontal circle to form a circular transducer array similar to the array illustrated in FIG. 1. More or less than twelve transducers may be used in this array, but twelve is a good practical number. Responsive to received sonic or ultra-sonic waves, each transducer provides an electric signal through a respective one of the transmission lines identified by reference numerals 62 through 73. The twelve transducers may, for example, be mounted on the submerged assembly of an air-towed sonar or a dunking sonar. The electric signals supplied to transmission lines 62 through 73 are transmitted to corresponding transmission lines 62' through 73' by any suitable signal transmission system 74. Transmission system 74 may be a multi-lead cable, or, preferably in the case of an air-towed sonar or a dunking sonar, it may be a carrier-current signal transmission system.

The twelve electric signals are recorded in parallel recording tracks on the drum 75 of a multi-channel magnetic recorder by the twelve recording heads identified in the drawing by reference numerals 76 through 87, inclusive. Magnetic drum 75, which may be about six inches in diameter, is rotated at a constant speed (2400 r.p.m., for example) in the direction indicated by arrow 88 by any suitable driving means such as electric motor 89.

Six pick-up heads, reference numerals 90 through 95, are positioned on drum 75 in the appropriate orientation for bringing into phase coincidence the six electric signals provided by transducers 50, 51, 52, 53, 60 and 61 responsive to a sonic wave traveling generally toward the right and having peaks arriving simultaneously at transducers 50 and 51. The six pick-up heads 90 through 95 are connected together in parallel, as shown, so that a signal of maximum amplitude is supplied through lead 96 responsive to a sonic wave received from the aforesaid direction only.

A second set of pick-up heads, 97 through 102, are arranged on the drum to provide through lead 103 an electric signal of maximum amplitude responsive to a received sonic wave traveling in the opposite direction to the first-mentioned wave. Other groups of pick-up heads are arranged, as shown, to provide through leads 104–109 electric signals of maximum amplitude responsive to received sonic waves traveling in six other different directions. Therefore, responsive to any received sonic wave there is an electric signal of maximum amplitude in that one of the eight lines 96 and 103 through 109 that most nearly represents the direction of travel of the received wave.

It will be noted that four rows of twelve pick-up heads define eight different directions of travel, and make it possible to determine the direction of travel of received waves with an accuracy of at least 45 degrees. For greater resolution, additional rows of pick-up heads can be added. For example, 360 different directions, providing a resolution of one degree or better, can be provided by 180 rows of twelve pick-up heads.

After being reproduced by the pick-up heads, the recorded signals are erased in the conventional manner by twelve erasing heads 110 through 121 that are supplied with high-frequency current by "erase" oscillator 122.

For visual presentation of the reproduced signals provided by the pick-up heads, an eight-position selector switch 123 is arranged to connect selectively any one of the eight lines 96 and 103–109 to a line 124. Signals supplied to line 124 are amplified by a conventional amplifier 125 and may be supplied to a vertical deflection plate of a cathode-ray tube 126 or the like. In this way any selected one of the eight electric signals provided by the eight sets of pick-up heads can be amplified and supplied to the vertical deflection plate of the cathode-ray tube. An eight-position selector switch 127, ganged to switch 123 for rotation in synchronism therewith, supplies to a horizontal deflection plate of cathode-ray tube 126 a different horizontal deflection voltage for each of the eight switch positions.

Now assume that the selector switches 123 and 127 are continuously rotated in the direction indicated by arrows 128 and 129. At each switch position selector switch 127 supplies a different voltage to the horizontal deflection plate of the cathode-ray tube so that the luminous spot on the phosphor screen of tube 126 is deflected horizontally across the screen. At different horizontal positions of the spot, voltages from different ones of the eight sets of pick-up heads are supplied to the vertical deflection plate of tube 126, and the spot is deflected vertically on the screen of tube 126 according to the direction and intensity of a received sonic wave. As a result, a visual presentation is provided for detecting and determining the direction of travel of received sonic waves. If desired, other types of visual presentation, such as the "PPI" type of presentation familiar to persons skilled in the radar and sonar arts, or various kinds of aural presentation, or automatic tracking, can be provided by appropriate combination and manipulation of the reproduced signals provided by the pick-up heads of the magnetic recorder.

The scanning apparatus shown in FIG. 4 has two principal disadvantages. First, for good resolution an extremely large number of pick-up heads is required. Second, directional scanning is not continuous, but proceeds in jumps from one selected direction to the next. Both of these disadvantages are overcome, and other important advantages are achieved, by the scanning apparatus illustrated in FIG. 5.

Referring now to FIG. 5 of the drawings, twelve electro-acoustic transducers, identified by reference numerals 130 through 141, are equally spaced around a horizontal circle to form a circular transducer array similar to the array shown in FIG. 1. A transmitter 142 is operable for generating and supplying to a line 143 electric signals at a selected frequency: 10, 12, or 14 kilocycles per second, for example. When the keying switch 144 is closed, "keying" pulse generator 145 supplies to line 146 repetitive electric pulses to key or "turn on" transmitter 142 for repetitive intervals of about 100 milliseconds' duration. Thus, transmitter 142 supplies to line 143 repetitive bursts, each approximately 100 milliseconds long, of electric energy at the selected frequency.

Signals from lines 143 and 146 are transmitted to line 143' and 146', respectively, by signal transmission system 147, which may be a multi-lead cable, or a multi-channel carrier-current signal transmission system, or any other system or combination of systems for transmitting electric signals. The keying pulses supplied to line 146' operate a duplexing relay 148 that connects the twelve transducers 130 through 141 to line 143' while transmitter 142 is operating. As a result, the transducer array transmits in all azimuth directions repetitive bursts of sonic waves at the selected frequency. The interval between successive bursts (controlled by the repetition period of "keying" pulse generator 145) is sufficiently long (between several seconds and several minutes) for the return of echoes from all underwater objects within sonar range before the next burst.

As soon as transmitter 142 stops operating, duplexing relay 148 connects the twelve transducers 130 through 141 to respective ones of twelve lines 149 through 160. Reflected sonic waves or "echoes" received by the transducer array are converted into twelve electric signals by the twelve transducers in the manner hereinbefore explained. The electric signals supplied by the transducers to lines 149 through 160 are transmitted by signal transmission system 147 to corresponding lines 149' through 160'. In an air-towed sonar or a dunking sonar, the portion of the apparatus to the left of transmission system 147 may be mounted on the submerged assembly, while the larger portion of the apparatus to the right of transmission system 147 may be located in the aircraft.

Lines 149' through 160' are connected to respective ones of twelve recording heads 161 through 172 of a multi-channel magnetic recorder. The twelve recording heads, preferably arranged in a straight line extending transversely across a magnetic recording drum 173, record the twelve electric signals in twelve side-by-side recording tracks on the surface of drum 173. The drum is rotated at constant speed by motor 174 in the direction indicated by arrow 175. Twelve pick-up heads, identified by reference numerals 176 through 187 are arranged across the width of drum 173 in alinement with corresponding ones of the recording heads to reproduce respective ones of the twelve signals recorded on the drum by recording heads 161 through 172.

Each of the twelve pick-up heads 176 through 187 is adjustably spaced from the corresponding one of the twelve recording heads 161 through 172, and these twelve spacings are continuously and repetitively varied, (for example, by the cam system shown in FIGS. 6 and 7 and hereinafter more fully described) at a selected scanning cycle frequency, usually about 10 cycles per second, out-of-phase with one another so that the differential spacings of the twelve pick-up heads from the twelve recording heads, and therefore the differential time delays of the twelve reproduced signals, are continuously and periodically varied. An electric timing motor 188, or any other suitable means, is used to drive the cam mechanism for continuously changing the relative positions of the twelve pick-up heads.

A scanning switch 189 has twelve stator contacts or brushes arranged in a circle and connected to respective ones of the twelve pick-up heads 176 through 187, as shown. Scanning switch 189 has a rotor with a semi-cirular conductive segment or rotor contact 190 that is connected through a collector 191 to a lead 192. The rotor of the scanning switch is mechanically connected to timing motor 188 and is rotated in the direction indicated by arrow 193 at a constant speed corresponding to the scanning cycle frequency: for example, at a speed of 10 revolutions per second for a 10 cycle per second scanning program. The scanning switch connects lead 192 to six-at-a-time of the twelve pick-up heads 176 through 187, and continuously and sequentially connects different combinations of six pick-up heads to lead 192 at a periodic rate of 10 cycles per second. In practice, a plurality of cam-operated single-pole switches may be used in place of the rotary switch 189, or a scanning capacitor may be used. Alternatively, switch 189 may be omitted and the twelve pick-up heads 176 to 189 may simply be connected in parallel to lead 192.

It will be noted that the twelve pick-up heads 176 through 187 are oriented on the surface of drum 173 substantially in the form of one cycle of a sine wave. As timing motor 188 rotates the cam mechanism to change the relative positions of the pick-up heads, the sine wave represented by the relative positions of the twelve pick-up heads moves toward the right across the surface of drum 173, and rotor 190 of the scanning switch rotates in a counter-clockwise direction for connecting lead 192 at all times to the pickup heads occupying the lower half-cycle of the sine wave.

In the positions of the parts shown in FIG. 5, the pick-up heads are arranged to bring into substantial phase coincidence the electric signals produced by transducers 130 and 136 through 141 responsive to a received sonic wave traveling in the direction of a line drawn from the center of transducer 139 to the center of transducer 133. As the relative positions of the pick-up heads are changed and as the scanning switch rotor 190 rotates, the direction of travel for a received sonic wave that produces maximum-amplitude signals in lead 192 rotates continuously in a counter-clockwise direction. Consequently, a 360 degree continuous search scanning program is provided for detecting sonic waves received from any azimuth direction. The scanning switch 189, or equivalent switches, eliminates signals from transducers on the back side of the array from the direction of search, for the reason that sonic waves received at such back-side transducers are apt to be distorted, as is indicated in FIG. 1.

The signals supplied to lead 192 are amplified and detected by a conventional amplifier and detector 194 and are supplied to the control grid of a cathode-ray tube 195 so that the brightness of the luminous spot on the phosphor screen of tube 195 represents the intensity of sonic waves received from the azimuth direction selected at that instant by the scanning mechanism. To provide a "PPI" type of visual presentation, two voltages in phase quadrature and of progressively increasing amplitude are supplied to the horizontal and vertical deflection plates of cathode-ray tube 195, so that the luminous spot on the screen of tube 195 repetitively traces a spiral path from the center of the screen outward.

The progressively increasing amplitude of the deflection signals may be provided by a "range" signal generator 196 that is synchronized with or triggered by the transmitter keying pulses and that provides between leads 197 and 198 a sawtooth waveform current that progressively increases in amplitude between the transmitter keying pulses. This sawtooth waveform current is applied to the rotor winding 199 of a two-phase synchro having quadrature-related stator windings 200 and 201 connected between the vertical deflection plates and the horizontal deflection plates, respectively, of cathode-ray tube 195, as shown. The rotor 199 is continuously rotated at the same speed as rotor 190 (about 10 cycles per second, for example) by a mechanical linkage 202 to timing motor 188. As rotor 199 rotates alternating voltages in phase quadrature are induced in windings 200 and 201 so that the luminous spot on the screen of tube 195 moves around the screen at ten revolutions per second. As the sawtooth current from the "range" signal generator increases in amplitude, the luminous spot moves outward on the screen, so that the spot follows a spiral path that covers substantially the whole viewing screen of tube 195.

It will be noted that a full 360 degree scan of azimuth directions is completed in 100 milliseconds, which is the duration of the signal bursts supplied by transmitter 142, so that a complete directional scan can always be completed within the duration of one sonic burst. The rotation of synchro rotor 199, in synchronism with scanning switch rotor 190 and the cyclic motion of pick-up heads 176 through 187, results in the production of bright spots on the screen of cathode-ray tube 195 in directions corresponding to the directions of underwater objects that reflect the transmitted sonic waves. Furthermore, because the spot on the screen of tube 195 follows a spiral path outward from the center of the viewing screen beginning with the transmission of each sonic burst, nearby reflecting objects produce bright spots near the center of the screen, while more distant reflecting objects, requiring a longer time for the return of the "echo" signal, produce bright spots nearer the edge of the cathode-ray tube screen. Thus tube 195 provides a "PPI" type of presentation that shows the range and direction of underwater objects.

Figure 7:
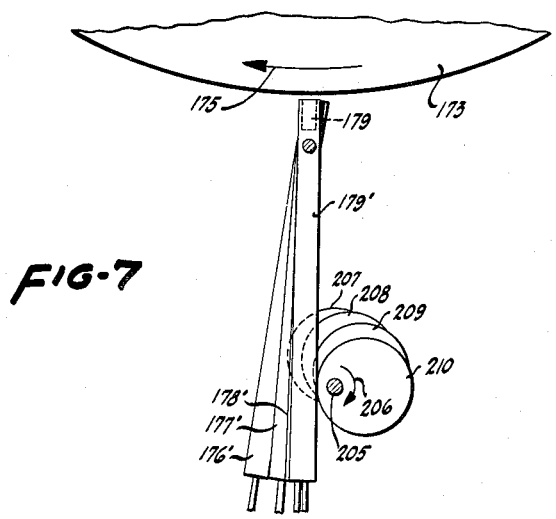
FIG. 7 is a fragmentary section taken along the line 7—7 of FIG. 6.
Figure 6:
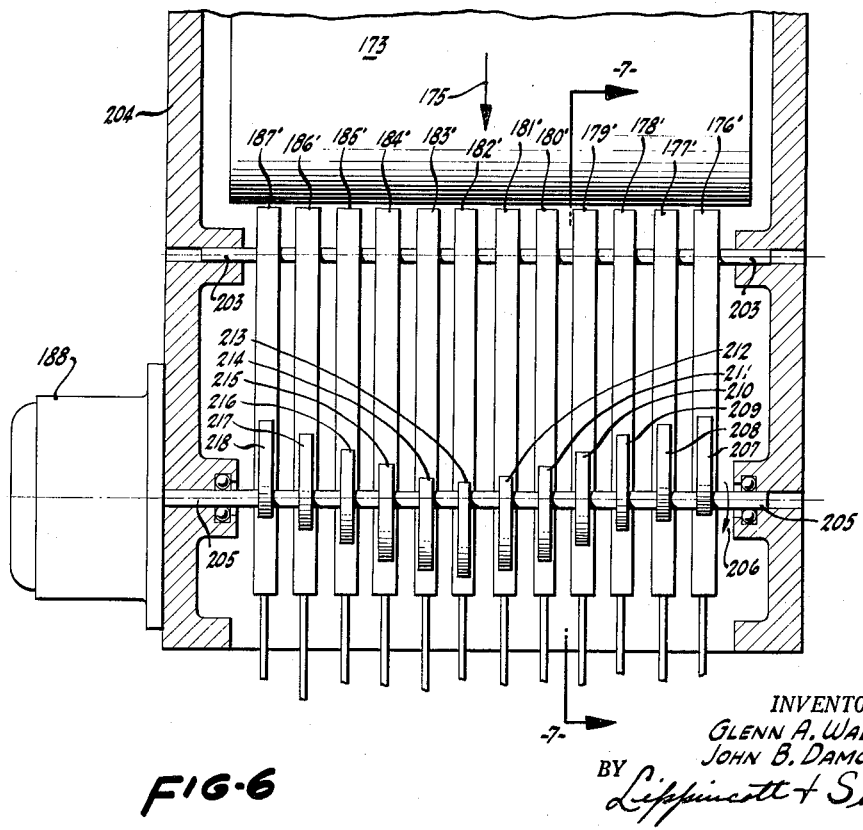
FIG. 6 is a schematic view of apparatus for continuously and periodically changing the relative positions of a plurality of pick-up heads in the magnetic recorder shown in FIG. 5.

The means for continuously adjusting the positions of the twelve pick-up heads 176 through 187 is best illustrated in FIGS. 6 and 7. Referring now to FIGS. 6 and 7, drum 173 rotates continuously at constant speed in the direction indicated by arrow 175, as previously explained. The twelve pick-up heads 176 through 187 are located adjacent to the surface of drum 173 within (or attached to) the upper ends of arms 176' through 187'. These twelve arms are pivoted on a shaft 203 attached to the stationary drum housing 204. Electrical connections to the twelve pick-up heads are made through leads brought out from the other ends of arms 176' through 187', as shown.

A cam shaft 205 is rotated continuously in the direction indicated by arrow 206 by timing motor 188 at a speed of 10 revolutions per second, or other selected scanning speed. Twelve cams, identified by reference numerals 207 through 218, are eccentrically mounted on shaft 205, as shown, and bear against respective ones of the arms 176' through 187', which act as cam followers. As shaft 205 rotates, the twelve cams oscillate each of the twelve arms about shaft 203, out-of-phase with one another, at a frequency of 10 cycles per second. FIGS. 6 and 7 show the pick-up heads in positions that they occupy one-half of a scanning cycle after the positions shown in FIG. 5. The cams 207–218 are about five times as far from shaft 203 as the pick-up heads, so that the motion of the pick-up heads is only one-fifth as great as the oscillatory motion produced directly by the cams. Consequently, the pick-up heads can be accurately positioned without requiring undue precision in the manufacture of cams.

It will be noted that the twelve arms carrying the twelve pickup heads swing from a position that is substantially perpendicular to the surface of drum 173 to a position that is materially slanting with respect to the perpendicular. As this occurs the magnetic heads are moved in a direction opposite to the direction of motion of the drum, or in other words are advanced in phase with respect to the signals recorded upon the drum, and at the same time are moved slightly away from the drum. This action is desirable in that the signals produced in the first transducers reached by a sonic wave traveling in a selected direction are recorded in channels that have pick-up heads closest to the drum, while the pick-up heads associated with other signals are moved away from the drum slightly, so that selected ones of the reproduced signals that are most important for the scanning direction under consideration are reproduced with greater amplitude than less important ones of the signals. This effects a tapering of signal amplitude across the scanning aperture of the system, and thereby reduces or suppresses minor lobes in the directional pattern of the array, at the expense of some reduction in over-all gain of the system.

The amount and type of taper in signal amplitude across the scanning aperture is determined by the location of the rotational axis of the pick-up heads relative to the rotational axis of the drum. If the rotational axis of the heads is placed closer to the drum surface, but farther from the drum axis than the radius of the drum, the heads will move through arcs having a smaller radius of curvature and the spacing of the heads from the drum surface will vary by a greater amount to provide a greater taper. Conversely, if the rotational axis of the heads is placed farther from the drum surface, the amount of taper will be reduced.

Still smaller amounts of taper may be achieved by arranging the heads to oscillate about an axis located on the opposite side of the drum surface (for example, about an axis closer to the drum axis than the drum radius) so that the heads move through arcs curved in the same direction as the drum surface. If the rotational axis of the heads coincides with the drum axis, the spacing between the heads and the drum surface will be constant, and there will be no taper in the amplitudes of the reproduced signals. This may be desirable in some instances for achieving maximum system gain, or minimum sonar beamwidth, or both, at the expense of larger minor lobes in the directional pattern.

A further advantage of tapering the amplitudes of the reproduced signals is that switch 189 may be omitted. As hereinbefore explained, the chief purpose of switch 189 is to eliminate the signals produced by transducers on the back side of the array from the selected instantaneous scanning direction. With the amplitude-tapering arrangement of the pick-up heads shown in FIGS. 6 and 7, it will be noted that each of the pick-up heads is closer to the drum during that half of the scanning cycle when the head occupies the lower half-cycle of the sign-wave pick-up head configuration shown in FIG. 5 than it is during the other half of the scanning cycle. Those pick-up heads occupying the upper half-cycle of the sign-wave configuration are so distant from the recording drum that their reproduced signals are negligibly small. Consequently, all of the twelve pick-up heads can be connected in parallel, omitting switch 189. The amplitude tapering provided by the arcuate motion of the pick-up heads insures that the major contribution to the composite signal is made by transducers on the forward side of the array with respect to the selected scanning direction, and that the contribution of signals provided by transducers on the back side of the array is negligible.

Insofar as the 360 degree search function is concerned, the same results can be achieved with movable recording heads and stationary pick-up heads as is achieved with stationary recording heads and movable pick-up heads in the arrangement illustrated. However, an important advantage of having stationary recording heads and movable pick-up heads is that several different sets of pick-up heads can be used with the same set of recording heads, with each set of pick-up heads operating independently of the other sets to provide different search functions and different scanning directions at the same time.

The apparatus thus far described supplies a visual presentation for the location of underwater objects. However, in many instances other types of presentation are desirable, and, in fact, provision for several types of presentations simultaneously greatly increases the chances of detecting and locating an underwater object. An important advantage of the scanning system herein described is that it can simultaneously provide several types of presentation and several types of search and tracking functions. For example, various types of aural presentation of various search functions can be provided simultaneously with, and without interrupting, the continuous 360 degree azimuth search and the visual presentation thereof hereinbefore described.

Again referring to FIG. 5, twenty-four additional pick-up heads, identified by reference numerals 219 through 244, are provided adjacent to the drum surface of the magnetic recorder, as shown. These additional pick-up heads, which may be arranged in two rows of fixed or stationary configuration, consist of eight groups of three heads connected in parallel, the three heads of each group being arranged in a configuration on the drum surface that provides an electric signal of maximum amplitude responsive to received sonic waves arriving from a respective one of eight different semi-quadrants of azimuth direction. The eight electric signals provided by the eight groups of stationary pick-up heads are supplied through eight transmission lines 243 through 250.

A plurality of beat-frequency oscillators 251 supply through four transmission lines 252 through 255 four electric signals having different audio frequencies. A network of selector switches and mixers 256 is provided so that various combinations of the signals supplied through lines 243 through 250 can be selected, added together, and tone-modulated with selected ones of the four audio frequencies supplied by the beat frequency oscillators. Selected ones of the signals from the stationary pick-up coils, combined and modulated in accordance with the particular type of search function desired, are supplied to lines 257 and 258. Terminals 259 and 260 may be provided at the selector switch and mixer matrix for receiving signals from the tracking system hereinafter described.

Some of the circuit connections that can be provided by the selector switches of network 256 are shown in FIGS. 9, 10 and 11, hereinafter more fully explained. It is evident that a great variety of switch arrangements can be made to provide many combinations of interconnections for combining the electric signals in any desired manner, and that the design of specific switching networks is a matter of common electrical skill. Therefore the switching networks used at 256 are not described in detail in this patent application.

A signal supplied at lead 257 is transmitted through a gain control potentiometer 261 and an amplifier 262 to one phone 263 of a conventional operator's headset. A signal supplied at lead 258, which may be different from the signal supplied at lead 257, is transmitted through a gain control potentiometer 264 and an amplifier 265 to the other phone 266 of the headset. By setting the selector switches of matrix 256 to supply selected ones of the signals from the pick-up heads to lead 257, selectively modulated with the audio frequencies supplied by beat-frequency oscillators 251, and to supply other selected ones of the signals, selectively modulated, to lead 258, various search and tracking functions well known to those skilled in the sonar art, such as tone-modulated binaural search, non-directive active or passive listening, and binaural tracking are selectively available to the operator without any interruption in the continuous 360 degree azimuth search and the visual presentation thereof provided on the screen of cathode-ray tube 195.

A plurality of erasing heads, reference numerals 167 through 178, are supplied with high frequency current from an "erase" oscillator 179 for erasing the twelve tracks recorded on magnetic drum 173 after the recorded signals have been reproduced by the various pick-up heads.

The apparatus herein described may be used either actively or passively. By active use it is meant that transmitter 142 operates periodically to transmit a burst of sonic energy, so that the "echoes" reflected from underwater objects can be detected. In passive operation, switch 144 is opened and the transmitter remains idle. However, any underwater sonic wave (produced, for example, by the engines of a surface or undersea craft) will be received by the transducers and presented visually upon the screen of cathode-ray tube 195 or aurally in phones 263 and 266, or both. It is, of course, possible to have both active and passive detection at the same time, since engine noise and the like can be received between transmitted pulses even when the transmitter is turned on periodically for active detection.

Reference is now made to FIG. 8 of the drawings, which illustrates an automatic tracking system, which may either be a separable piece of apparatus or may advantageously be combined with the apparatus shown in FIG. 5. When the tracking system shown in FIG. 8 is combined with the apparatus shown in FIG. 5, a considerable number of the parts are common to the two systems, and these common parts are identified by the same reference numerals in FIGS. 5 and 8.

Responsive to received sonic or ultrasonic waves, whether originating in or reflected from an underwater object, the transducer array 130–141 supplies twelve electric signals that are transmitted through signal transmission system 147 to transmission lines 149′ through 160′, as hereinbefore explained. The automatic tracking systems may use the same magnetic drum 173 as was used by the search system shown in FIG. 5, either the reverse half or a parallel side portion of drum 173 being used for the automatic tracking system. Preferably, two side-by-side portions of the magnetic drum are used for the search and tracking systems respectively, since the signals recorded by the search system are erased at each revolution of the drum, while it may be desirable to retain recorded signals in the tracking system for a plurality of drum revolutions. Drum 173 is rotated at constant speed by motor 174 in the direction indicated by arrow 175, as hereinbefore explained.

A relay 280, or preferably a series of electronic gates that perform the same functions as the relay but operate at higher speeds, is operable to connect leads 149′ through 160′ to respective ones of twelve magnetic recording heads identified by reference numerals 281 through 292. When relay 280 is closed, the twelve electric signals provided by the twelve transducers 130 through 141 are recorded in twelve parallel tracks on the surface of drum 173. Relay 280 may then be opened, and the same recorded signal retained on the drum for as long a period as may be desired. The recorded signals can be erased by closing the contacts of relay 293, which connects the "erase" oscillator 279 to twelve erasing heads identified by reference numerals 294 through 305.

Twelve pick-up heads 306 through 317 are arranged to reproduce the twelve signals recorded on the surface of drum 173 by recording heads 281 through 292. The differential spacing of the twelve pick-up heads from the twelve recording heads is adjustable by a cam mechanism similar to that shown in FIGS. 6 and 7 and hereinbefore described, with the difference that the cam mechanism shown in FIGS. 6 and 7 is rotated at constant speed by timing motor 188, whereas the cam mechanism for adjusting the positions of heads 306 through 317 is operated by a reversible servomotor 318 controlled in a manner hereinafter explained to track automatically an underwater object. The cam mechanism can also be rotated by means of a manual adjustment knob 319 through a suitable mechanical or servo linkage.

A scanning switch 320 has twelve stator contacts or brushes arranged in a circle and connected to respective ones of the twelve pick-up heads 306 through 317, as shown. The scanning switch has a rotor with two quarter-circular conductive segments or rotor contacts 321 and 322 that rotate together and are connected to the stator contacts in adjacent quadrants of the scanning switch. There is a sufficient spacing between the two rotor contacts or segments to prevent shorting by simultaneous contact with the same stator contact. Rotor contact 321 is connected to a lead 323, and rotor contact 322 is connected to a lead 324, through suitable collectors. In place of scanning switch 320, a plurality of cam-operated single-pole switches may be used to make the same connections, or a scanning capacitor may be employed The rotor of the scanning switch is linked to the cam mechanism of the pick-up heads, either mechanically or by a servo system, and rotates synchronously therewith. A suitable subtracing circuit, such as the differential transformer 325, supplies to a lead 326 an electric signal proportional to the vector difference between the electric signals supplied to leads 323 and 324 by the scanning switch rotor. An adding circuit, such as the transformer 327, supplies to a lead 328 a signal that is proportional to the vector sum of the two signals supplied to leads 323 and 324.

Assume that a received sonic wave is traveling in the direction of the line drawn from the center of transducer 139 to the center of transducer 133. Responsive to this received sonic wave, transducer 139 provides a first electric signal, transducers 138 and 140 provide two electric signals in phase with each other but positioned in time behind the signal provided by transducer 139, transducers 137 and 141 provide two electric signals in phase with each other but positioned in time behind the signals produced by transducers 138 and 140, and transducers 130 and 136 provide two other electric signals in phase with each other but positioned in time behind the signals provided by transducers 137 and 141. These seven electric signals are recorded on drum 173 by recording heads 281 and 287 through 292.

With the pick-up heads oriented as shown in FIG. 8, pick-up heads 306 and 312 through 317 reproduce the aforesaid seven recorded signals with differential time delays such that the seven reproduced signals are substantially in phase coincidence. Three of the reproduced signals are transmitted through rotor contact 321 of the scanning switch to line 323, and another three of the reproduced signals are transmitted through rotor contact 322 to line 324. Thus, under the conditions assumed where the tracking apparatus is adjusted to a scanning direction precisely alined with the direction of travel of the received sonic wave, the two electric signals provided in lines 323 and 324 are substantially equal and in phase. Consequently, the sum signal provided at lead 328 has maximum amplitude, and the difference signal provided at lead 326 has substantially zero amplitude.

However, if the scanning direction is not precisely alined with the direction of the received sonic wave, it is apparent that the two electric signals provided in leads 323 and 324 will not be equal in phase and amplitude, and that a difference signal will appear at lead 326. Therefore, the difference signal at lead 326 is in the nature of an error signal indicating that the scanning direction selected by the tracking apparatus is not precisely alined with the direction of the received sonic wave. Furthermore, if the scanning direction established by the tracking apparatus differs from the direction of travel of the received sonic wave in one angular direction, the error signal at lead 326 will be substantially in phase with the sum signal at lead 328, while if the difference is in the other angular direction the error signal will be substantially in phase opposition to the sum signal. Therefore, the phase relation between the signals at leads 328 and 326 indicates the direction of error in the scanning direction of the tracking system.

Instead of using the scanning switch 320, or an equivalent switching device, for connecting leads 323 and 324 to different selected pluralities of the heads 306–314, all of the heads 306–314 may be connected in parallel to lead 323 and a similar row of heads may be connected in parallel to lead 324. The cam mechanisms for the two rows of pick-up heads are operated synchronously, but with a slight phase difference so that the two rows of heads tend to establish two slightly different scanning directions. The effective scanning direction of the tracking system then lies midway between the two scanning directions of the two sets of pick-up heads.

When automatic tracking is desired, a relay 329, or a pair of electronic gates performing the functions of the relay but operable at higher speeds, connect leads 326 and 328 to the input terminal of a phase detector 330. Phase detector 330 supplies to lead 331 an electric signal of one polarity when the signals in leads 326 and 328 are substantially in phase, and supplies at lead 331 an electric signal of the opposite polarity when the signals in leads 326 and 328 are substantially in phase opposition. This electric signal, acting through a motor controller 332, operates reversible servomotor 318 in one direction or the other, depending on the polarity of the signal in lead 331, to correct the error and bring the scanning direction of the tracking system into coincidence with the direction of the received wave. In other words, a servo system has been provided for automatically adjusting the tracking mechanism responsive to any inequality in the signals provided at leads 323 and 324. It will be appreciated by those skilled in the art that many other servo systems, the principles of which are well known and need not be described, may be used for this purpose instead of the system schematically illustrated herein.

Instead of using the automatic servo system for tracking, the sonar operator himself may act as the servo. For this purpose leads 323 and 324 are connected to the terminals 259 and 260 of the selector switch matrix shown in FIG. 5, so that these two signals can (by appropriate positioning of the selector switches to provide the circuit connections illustrated in FIG. 11) be tone-modulated by beat frequency oscillators 251 and transmitted to respective ones of the phones 263 and 266 of the operator's headset. The operator then turns knob 319 to adjust the scanning direction of the tracking mechanism until the aural presentation at his headset indicates equality of the signals in leads 323 and 324.

Furthermore, adjustment knob 319 may be used if the operator wishes to preset the mechanism to some selected scanning direction for determining whether or not any underwater object can be located in that azimuth direction, even though strong echoes may be received from nearby objects in other directions. In other words, knob 319 may be adjusted to a selected scanning direction to provide a "searchlight" type of search function.

Whether the tracking mechanism is manually or automatically controlled, an indicator is required to display the scanning direction for which the tracking mechanism is set. Such an indicator may be provided by a simple scale and index 333 linked to the cam mechanism driving the pick-up heads, either by a direct mechanical linkage or by a servo mechanism.

FIGS. 9, 10 and 11 show some of the circuit connections that can be made by the network of selector switches and mixers 256 of FIG. 5 to provide various different search and tracking functions. Since many different switch arrangements can be used to provide these and other interconnections, the design of which involves only common electrical skill, the switching circuits are not shown in detail. Furthermore, in addition to the headset comprising phones 263 and 266, other headsets may be provided so that different ones of the search and tracking functions can be supplied simultaneously to several operators. Also, additional cathode-ray tubes may be provided so that any of these functions can be presented visually.

Thus the scanning system herein described is ideally suited to multiple operator control where personnel are assigned to separate tasks. For example, one operator may be assigned a continuous PPI search task, other operators may be assigned search tasks in specific sectors of interest, and still other operators, under the direction of search personnel, may track individual targets of interest. All presentations can be of a visual or an aural type, or both, and in general simultaneously presenting identical information to both the visual and aural senses enhances the detection range.

Alternatively, a single operator may perform several search tasks simultaneously. For example, a single operator can observe the 360 degree continuous search presented visually on the screen of cathode-ray tube 195, and can simultaneously perform a sector search or a tracking operation through the information presented aurally by phones 263 and 266 of the headset.

FIG. 9 shows circuit connections for omnidirectional listening. As hereinefore explained, signals received from the eight semi-quadrants of azimuth direction are supplied to respectives ones of lines 243–250 by the stationary pick-up heads of the magnetic recorder. For omnidirectional listening, all eight of the lines 243–250 are connected to the two lines 257 and 258, so that signals received from any azimuth direction are supplied to the operator's headset. A mixer 334 is connected in the circuit so that the received signals can be tone-modulated, if desired, with any one of the four audio-frequency signals supplied through lines 252–255 by beat-frequency oscillators 251. A selector switch 335 is provided for selecting the desired audio tone.

FIG. 10 shows circuit connections for multi-tone binaural listening. Lines 243–250 are connected to respective ones of eight mixers 336–343, as shown. Lines 252–255 are connected to respective pairs of the eight mixers, so that the two signals from the two semi-quadrants in each quadrant of azimuth direction are modulated with the same audio tone, while signals from the four different quadrants are modulated with four different audio tones. The signal from one semi-quadrant of each quadrant is supplied to lead 257, and the signal from the other semi-quadrant to each quadrant is supplied to lead 258. Since leads 257 and 258 are supplied to different phones of the operator's headset, binaural listening is provided that permits the operator to identify the approximate direction within any quadrant from which a signal may be received. The quadrant is identified by the particular audio tone with which the signal is modulated. After the approximate direction has been determined by the operator, the exact direction can be pin-pointed either by providing means for adjusting slightly the position of the "fixed" pick-up heads so that signals of a given tone supplied to leads 257 and 258 can be brought into phase, or the direction can be pin-pointed by switching over to a tracking function.

FIG. 11 shows circuit connections for binaural tracking. Terminals 259 and 260, connected to the tracking scanning heads as hereinbefore explained, are supplied with signals that are in phase when the tracking systems is adjusted to the azimuth direction of the underwater object. The signal supplied to terminal 259 is transmitted through line 257 to one phone of the operator's headset, while the signal supplied to terminal 260 is transmitted through line 258 to the other phone of the operator's headset. In this manner, the operator can easily determine when the two signals are in phase coincidence, and can thereby determine the direction of the underwater object. Mixers 344 and 345 and selector switch 346 may be provided so that the signal supplied to the operator's headset may, if desired, be modulated with any of the audio frequencies supplied through leads 252–255 by beat-frequency oscillators 251.

Again referring to FIG. 8 of the drawings, it has been pointed out that relays 280 and 293 provide means whereby recorded signals are not necessarily erased and re-recorded at each revolution of drum 173. Advantage may be taken of the fact for several purposes. Assuming that drum 173 rotates at a speed of 2400 r.p.m. or 40 revolutions per second, it is apparent that the drum can store the signals received during any selected 25 millisecond interval.

Assume, for example, that relay 280 is closed for 25 milliseconds at a selected time interval after the transmission of a burst of sonic waves, so that received signals corresponding to a selected range or distance are recorded and stored on the drum. So long as relay 293 remains open these signals will not be erased, and consequently the signals can be retained on the drum for any desired length of time while the tracking apparatus operates to locate the azimuth direction of the underwater object.

At approximately the same time interval after the transmission of the next burst of sonic waves, relay 293 can be closed for a short interval to erase the previously recorded signals, and relay 280 can be closed for another 25 millisecond interval for recording another set of received waves from the same range or distance. In this way signals corresponding to a selected range only are recorded on the tracking portion of drum 173, and these signals are stored or retained during the relatively long interval between transmitted bursts for accurate automatic or aural tracking of a selected underwater object.

Now assume that relay 280 is closed for 25 millisecond intervals at times corresponding to a selected range, while relay 293 remains open so that several such sets of signals are recorded one over another. Assume further that the transmitted signals are synchronized with the drum rotation so that the echo signals coincide in phase at each recording. This is easily accomplished, either by synchronizing the rotational speed of drum 173 with the transmitter oscillator, or by synchronizing the transmitter oscillator with drum 173. A convenient way of doing the latter would be to have an additional track on the drum containing a permanent recorded signal that can be reproduced by a suitable pick-up head and used as a signal generator or a synchronizing means for the transmitter.

In a system of this type, received echoes from the target or underwater object that is to be located will be in synchronism or coherent with the transmitted signal, while received noise will not be coherent. Therefore successively recorded portions of the desired signal will re-enforce each other, while noise signals will tend to cancel out, thereby increasing the signal-to-noise ratio so that relatively weak signals can be detected. In other words, a coherence technique is provided for detecting weak echoes in the presence of relative large noise.

In this arrangement, it is of course necessary to use a recording method such that a plurality of signals recorded successively at the same angular position of the drum add together, and not a system in which the last signal recorded erases previously recorded signals. There are various ways in which vector addition of the successively recorded signals can be obtained. One way is to use a recording medium that integrates the recorded information by responding to the intensity-time product, as photographic emulsions do. Since ordinary magnetic recording media generally do not respond in this manner, other techniques may be advantageous when a magnetic recorder is employed. For example, the recording heads may be moved sidewise periodically to form a relatively wide recording track consisting of several side-by-side successively recorded portions. A wide pick-up head will respond to the average magnetization across the width of the track, and thereby add together the successively recorded signals. Another approach is to use feedback circuits as hereinafter described.

An alternative arrangement for making use of coherent techniques is illustrated in FIG. 12. Referring now to FIG. 12, magnetic recording drum 173' is rotated at constant speed by motor 174' in the direction indicated by arrow 347. Recording heads 161 through 172 correspond to the similarly numbered recording heads shown in FIG. 5, and record twelve signals from the transducer array in twelve separate side-by-side recording tracks on the surface of drum 173' in the manner hereinbefore explained. Pick-up heads 176 through 187 are positioned by timing motor 188 in the manner hereinbefore explained to provide a continuous 360 degree search function signal through lead 192. Fixed pick-up heads 219 through 242 are arranged as hereinbefore explained to supply through leads 243–250 eight electric signals responsive to sonic waves received from respective ones of eight semi-quadrants of azimuth direction. Leads 192 and 243–250 are connected as shown in FIG. 5 for providing various search functions. Erasing of the twelve recorded tracks is provided by "erase" oscillator 279 and the twelve erase heads 267–278 in the manner hereinbefore explained. In other words, the parts of the FIG. 12 apparatus described thus far are identical to correspondingly numbered parts of the FIG. 5 apparatus, and operate in exactly the same manner.

Twelve additional pick-up heads, reference numerals 348 through 359 inclusive, are adjustably positioned on the surface of drum 173' by a cam mechanism similar to that shown in FIGS. 6 and 7, with the exception that the cam shaft is connected to a manually adjustable control knob 360 instead of being connected to timing motor 188. This cam shaft may also be connected to rotate in synchronism with drum 173' by closing a normally-open clutch 361. For the present, assume that clutch 361 is open, and that pick-up heads 348–359 remain stationary in relative positions that can be adjusted by turning control knob 360. Accordingly, the twelve pick-up heads 348–359 can be adjusted for any selected scanning direction to provide a "search light" type of search function. Heads 348–359 are connected in parallel through an impedance matching transformer 362 to a line 363, so that electric signals of maximum amplitude are supplied to line 363 responsive to received sonic waves traveling in the selected scanning direction.

Drum 173' has two additional recording tracks for purposes hereinafter described. Associated with one of these additional recording tracks there is a recording head 364, a stationary pick-up head 365, and an erasing head 366. Associated with the other additional recording track there is a recording head 367, a stationary pick-up head 368, and an erasing head 369.

An oscillator 370 supplies an electric signal that is recorded by head 364 and reproduced by head 365. Head 366 is connected to erase oscillator 279 so that the recorded signal is erased after it passes pick-up head 365, and this recording track is cleared for additional recording by head 364. The reproduced signal from pick-up head 365 is supplied through line 371 to a phase detector 372 that continuously compares the phase of the reproduced signal with the phase of the recorded signal supplied by oscillator 370 and supplies through line 373 an error signal responsive to any deviation from a selected phase relation of these two signals. The error signal is supplied through line 373 to a motor controller 374 that regulates the speed of motor 174' to maintain a constant phase relation between the signal recorded by head 364 and the signal reproduced by head 365. In this way the number of recorded wavelengths on the drum surface between heads 364 and 365 is kept constant, and since the recorded wavelength is a function of the drum speed as well the oscillator frequency, the speed of drum 173' is accurately controlled by the oscillator.

The signals recorded by recording head 367, as hereinafter explained, are reproduced by pick-up head 368, amplified by an amplifier 375, and supplied to a suitable presentation device such as the operator's headset 376. The amplified reproduced signals are also supplied through a normally closed switch 377 and a rectifier 378 to an adding network comprising resistors 379, 380 and 381 connected as shown. Line 363 is connected to resistor 380 through a rectifier 382, so that the signal from pick-up heads 348–359 is rectified or detected and added to the rectified or detected signal supplied through rectifier 378 by pick-up head 368 and amplifier 375. The sum of these two signals controls a modulator 383 connected to modulate the signal supplied by oscillator 370 and supply the modulated signal through a range gate 384 to recording head 367, so that when range gate 384 is open (transmits signals and is equivalent to a closed switch) recording head 367 records on drum 173' a signal having a frequency determined by oscillator 370 and an amplitude determined by the sum of the signal supplied by pick-up heads 348–359 in parallel and the signal supplied by pick-up head 368.

Erase head 369 is connected to erase oscillator 279 through a range gate 385. Range gates 384 and 385 are controlled by signals supplied by range selector 386 at selected values of the sawtooth signal supplied by "range signal" generator 196. In other words, range gates 384 and 385 are opened to transmit electric signals, and therefore are equivalent to closed switches, for brief intervals (about 100 milliseconds, for example) at certain times corresponding to a selected sonar range, and are closed (equivalent to open switches) at other times.

Assume, for example, that the sonar operator suspects that an underwater object is located at a certain range and direction, but that the received echoes from this underwater object are too weak in relation to noise signals received for reliable detection by ordinary search and tracking means. The operator adjusts knob 360 to the selected direction, and adjusts range selector 386 to the selected range. Following transmission of a burst of sonic waves by a time interval corresponding to the selected range, range selector 386 supplies control signals to range gates 384 and 385 that cause the two range gates to transmit electric signals for about 100 milliseconds, which is the assumed duration of a transmitted burst of sonic waves and is four times as great as the time required for one revolution of drum 173'. A signal corresponding to the received echo plus considerable noise is supplied by pick-up heads 348–359 through line 363, rectifier 382, and adding network 379–381 to modulator 383.

Modulator 383 supplies a modulated signal through range gate 384 that is recorded by recording head 367. After a time delay corresponding to the time required for the surface of drum 173 to rotate through a distance equal to the spacing between heads 367 and 368, the recorded signal is reproduced by head 368, amplified by amplifier 375, rectified by rectifier 378, and added to the signal then being received. In other words, modulator 383, range gate 384, recording head 367, the surface of drum 173', pick-up head 368, amplifier 375, rectifier 378, and adding network 379–381 are parts of a positive feedback loop preferably adjusted to have a gain near unity so that, in the absence of any input signal from heads 348–359 the signal in the feedback loop would remain substantially constant at any signal level previously established. In practice, the gain of the feedback loop may be made slightly less than one for greater circuit stability.

As successive portions of the input signal are added to the signal in the feedback loop, the signal level in the feedback loop increases. It can be shown mathematically that coherent signals, such as the echoes reflected from an underwater object that is to be detected, add together linearly, while noise signals add together in accordance with the square root of the sum of their squares. Consequently, the amplitudes of coherent signals build up in the feedback loop more rapidly than the amplitudes of noise signals, and the signal-to-noise ratio gradually increases.

At the end of the 100 millisecond time interval, range gates 384 and 385 are closed by range selector 386, and the signals previously recorded are stored on the surface of drum 173' until a time following the next transmitted burst of sonic waves that again corresponds to the selected range. Gates 384 and 385 are then opened for another 100 millisecond interval, and the build-up of the signal level in the feedback loop continues to increase, with a further increase in the signal-to-noise ratio. Through this technique, the signal-to-noise ratio can be increased sufficiently for the detection of weak echoes that could not be detected by other means.

If the direction of the suspected underwater object is unknown, clutch 361 may be closed so that the cams for positioning pick-up heads 348–359 are rotated in synchronism with drum 173'. The apparatus will then perform a 360 degree azimuth search at the selected range, and signals from each azimuth direction will be recorded at fixed points on the surface of drum 173' so that coherence between successive signals received from the same azimuth direction will be achieved. The amplitude of signals produced by echoes will build up faster in the feedback loop than the amplitudes of signals due to noise, as hereinbefore explained, and after a number of search cycles have been completed the signal-to-noise ratio will have been increased sufficiently to increase greatly the probability of detecting weak echoes.

When the clearing of stored information from the drum is desired so that a new search can be begun at a different range or in a different direction, switch 377 is opened to interrupt the feedback circuit, and after one revolution of drum 173' all of the stored information will have been erased. A normally open switch 387 may be connected in parallel with range gate 385, if desired, to facilitate erasure of the recorded signals.

It may sometimes be desirable to use coherence techniques in a "search light" function for detecting suspected underwater objects situated in a selected azimuth direction but at an unknown range. For this purpose clutch 361 is opened and adjustment knob 360 is turned to adjust pick-up heads 348–359 to the appropriate configuration for the selected scanning direction. Lead 363 is then connected to the circuit shown in FIG. 13. In this case, because of the longer storage period involved, a magnetic tape recorder is preferably used instead of the magnetic drum, and the circulation of signals in the feedback loop must be synchronized with the transmitted bursts of sonic waves so that successive signals received from the same range will be coherent.

Referring now to FIG. 13, a magnetic tape 388 or the like is driven in the direction indicated by arrow 389 at a constant speed by conventional tape transport apparatus, represented in the drawing by rollers 390 and 391 and the driving motor 392. For synchronizing purposes, pulses from "keying" pulse generator 145 of the FIG. 5 apparatus (or, alternatively, portions of the signal bursts generated by transmitter 142) are recorded on the tape by a recording head 393. These pulses are reproduced by a pick-up head 394 after a time interval depending upon the speed of tape 388 and the length of tape between heads 393 and 394. The reproduced pulses are amplified by amplifier 395 and supplied through line 396 to synchronize the operation of keying pulse generator 145 so that the time interval between successive keying pulses is substantially equal to the time delay provided in the tape recorder.

An oscillator 397 provides an electric signal that is modulated by a modulator 398 and recorded on tape 388 by a recording head 399. After a time interval equal to the interval between transmitted bursts of sonic waves, the signals recorded by head 399 are reproduced by a pick-up head 400 and amplified by an amplifier 401. The amplified signal is transmitted through a normally closed switch 402 and a rectifier or detector 403 to an adding network comprising resistors 404, 405 and 406, connected as shown. Line 363 is connected to the adding network through a rectifier or detector 407. The sum voltage from the adding network controls modulator 398 so that the amplitude of the signal recorded by heads 399 is proportional to the sum of the amplitudes of the signals provided by line 363 and amplifier 401. The output of amplifier 401 is connected to a visual or aural presentation device such as the operator's headset 408.

Modulator 398, recording head 399, tape 388, pick-up head 400, amplifier 401, rectifier 403, and adding network 404–406 are a part of a positive feedback loop that preferably has a gain near unity so that in the absence of any signal supplied through line 363 the signal level in the feedback loop remains substantially constant at any previously established signal level, or decays slowly in comparison to the circulation time of the feedback loop. Signals supplied through line 363 increase the signal level in the feedback loop so that successive received signals are added together. Because the time required for a signal to travel around the feedback loop is equal to the time interval between successive transmitted bursts of sonic waves, successive echoes received from an underwater object located at any given range are coherent with one another, but noise signals are not coherent. The coherent signals add together linearly, while the non-coherent noise signals add together according to the square root of the sum of their squares, whereby the signal-to-noise ratio is increased so that weak echoes can be detected that could not be detected by other means.

In mathematical terms, it can be shown that for either of the coherence systems shown in FIGS. 12 and 13, the signal-to-noise ratio is improved by a factor equal to $$\sqrt{\frac{(1+G)(1-G^{N+1})}{(1-G)(1+G^{N+1})}}$$

where G is the gain of the feedback loop and N is the number of feedback cycles. In other words, N is the ratio of the time during which the feedback signal has been building up to the circulation time required for a signal to travel once around the feedback loop. The same mathematical relation applies to multiple recording on the drum in the FIG. 8 apparatus, in which the drum is in effect a feedback loop having a gain of substantially one and a circulation time equal to the rotational period of the drum. It can be shown that this expression has a maximum value at $G=1$; and that at $N=$infinity the improvement in signal-to-noise ratio is $$\sqrt{\frac{1+G}{1-G}}$$

If $G=1$, the improvement in signal-to-noise ratio is equal to $\sqrt{N+1}$. For circuit stability under all conditions, it may be desirable to make G slightly less than 1, but for small values of N, G may be equal to or even slightly greater than 1 without practical instability.

Although the invention herein described is particularly useful in sonar apparatus, certain aspects of the invention, including the coherence techniques, may be useful in other applications such as radar and communication systems.

For clarity, apparatus for performing different types of search functions have herein been separately illustrated and described. In practice, all or selected portions of the apparatus herein described may advantageously be incorporated in a single sonar, since the presentation of different search functions in different ways at the same time greatly increases the probability of detecting and locating an underwater object. The different apparatus shown in different figures in the drawings may have many parts in common, which have been identified by the same reference numbers throughout the drawings. A very significant advantage of sonar apparatus embodying principles of this invention is its ability to provide, with relatively simple and compact apparatus adapted for air-towed and dunking sonar operation, a greater variety of functions and presentations than has heretofore been feasible.

It should be understood that this invention in its broader aspects is not limited to specific embodiments herein illustrated and described, and that the following claims are intended to cover all changes and modifications that do not depart from the true spirit and scope of the invention.

What is claimed is:

1. Sonar apparatus comprising a circular array of transducers each providing an electric signal responsive to a received sonic wave, a magnetic recording drum, means for rotating said drum, a plurality of magnetic recording heads arranged in a straight line across the width of said drum, signal transmission means connecting each of said transducers to a different one of said recording heads so that said electric signals are recorded simultaneously side-by-side on said drum, a plurality of pick-up heads arranged across the width of said drum, said pick-up heads being alined and spaced along the circumference of said drum from corresponding ones of said recording heads for reproducing said electric signals, means for adding together the electric signals reproduced by a plurality of said pick-up heads to provide a sum signal, a plurality of cams mounted on a rotative cam shaft, each of said cams moving a different one of said pick-up heads back-and-forth along the circumference of said drum as said cam shaft rotates, the motion of each pick-up head being out-of-phase with the motions of the others so that the time and phase relations of the reproduced signals change as the cam shaft rotates.

2. Sonar apparatus as defined in claim 1, wherein said cam shaft is continuously rotated by a motor to provide continuous azimuth scanning.

3. Sonar apparatus as defined in claim 1, wherein said cam shaft is automatically positioned by a servo mechanism responsive to said sum signal.

4. Sonar apparatus comprising a plurality of transducers arranged in a circle, each of said transducers providing an electric signal responsive to a received sonic wave, a multi-channel magnetic recorder having a plurality of recording channels each including a recording head and a pick-up head, signal transmission means connecting each of said transducers to a different one of said recording heads so that each of said electric signals is individually recorded by one of said recording heads and individually reproduced by one of said pick-up heads, each of said pick-up heads being spaced an adjustable distance from the corresponding recording head so that each of said recording channels provides an adjustable delay of its reproduced signal relative to its recorded signal, adjusting mechanism for continuously and repetitively adjusting said adjustable distances in each of said channels out-of-phase with such adjustment in the others of said channels, a scanning switch having a plurality of stator contacts arranged in a circle, the arrangement of said stator contacts being similar to the arrangement of said transducers, means connecting each of said stator contacts to a different one of said pick-up heads so that said reproduced signals are transmitted to stator contacts corresponding in position to the transducers providing the corresponding recorded signals, a substantially semi-circular rotor contact connected to substantially one-half at a time of said stator contacts for adding together a plurality of said reproduced signals to provide a sum signal, said rotor contact being coupled to said adjusting mechanism and being continuously rotated thereby, said adjusting mechanism automatically maintaining said pick-up heads in positional relation to said recordng heads such that a received sonic wave traveling in a direction corresponding to the instantaneous position of said rotor contact provides reproduced electric signals at said stator contacts that are substantially in phase coincidence, and means for displaying the amplitude of said sum signal as a function of the angular position of said rotor contact.

5. Sonar apparatus comprising a plurality of transducers arranged in a circle, each of said transducers providing an electric signal responsive to a received sonic wave, a multi-channel magnetic recorder having a plurality of recording channels including a recording head and a pick-up head, signal transmission means connecting each of said transducers to a different one of said recording heads so that each of said electric signals is individually recorded by one of said recording heads and is individually reproduced by one of said pick-up heads, each of said pick-up heads being spaced an adjustable distance from the corresponding recording head so that each of said recording channels provides an adjustable delay of its reproduced signal relative to its recorded signal, adjusting mechanism for adjusting the relative values of said adjustable distances, a scanning switch having a plurality of stator contacts arranged in a circle, the arrangement of said stator contacts being similar to the arrangement of said transducers, means connecting each of said stator contacts to a different one of said pick-up heads so that said reproduced signals are transmitted to stator contacts corresponding in position to the transducers providing the corresponding recorded signals, two substantially quarter-circular rotor contacts rotative together and respectively coupled to the stator contacts in adjacent circular quadrants of said scanning switch so that two pluralities of said reproduced signals are added together to provide two sum signals at respective ones of said rotor contacts, said rotor contacts being coupled to said adjusting mechanism and being rotated thereby, said adjusting mechanism automatically maintaining said pick-up heads in positional relation to said recording heads such that a received sonic wave traveling in a direction corresponding to the mean instantaneous position of said rotor contacts provides reproduced electric signals at said stator contacts that are substantially in phase coincidence, and a servo mechanism for automatically adjusting said adjusting mechanism to bring the amplitudes of said two sum signals substantially to equality.

6. Sonar apparatus comprising an array of transducers for providing a plurality of electric signals responsive to a received sonic wave, said signals having peaks separated in time by intervals depending upon the direction of travel of said sonic wave, a multi-channel recorder having a moving storage element, a plurality of recording heads for recording said electric signals individually on said storage element, a plurality of sets of pick-up heads, each of said sets consisting of a plurality of pick-up heads spaced at different distances in the direction of motion of said element from corresponding ones of said recording heads for reproducing a plurality of said electric signals with differential time delays, said pick-up heads of each set being connected in parallel to provide a composite signal that has a maximum amplitude responsive to received sonic waves traveling in a selected scanning direction, composite signals supplied by different ones of said sets having maximum values for different scanning directions, and means for comparing the relative amplitudes of a plurality of said composite signals.

7. Sonar apparatus comprising a circular array of transducers for providing a plurality of electric signals responsive to a received sonic wave, said signals having time relations depending upon the direction of travel of said sonic wave, a multi-channel magnetic recorder having a rotating storage drum, a plurality of recording heads for recording said electric signals individually side-by-side on said drum, a plurality of sets of pick-up heads, each of said sets consisting of a plurality of pick-up heads spaced at different distances in the direction of motion of said drum from corresponding ones of said recording heads for reproducing a plurality of said electric signals with differential time delays, said pick-up heads of each set being connected in parallel to provide a composite signal that has a maximum amplitude responsive to receive sonic waves traveling in a selected scanning direction, different ones of said sets having different arrangements of pick-up heads therein such that the composite signals supplied by different ones of said sets have maximum values for different scanning directions, and direction-presentation apparatus simultaneously responsive to a plurality of said composite signals.

8. Scanning apparatus for sonar systems and the like, comprising a multi-channel recorder having a moving storage element, means for recording a plurality of signals individually in separate recording tracks on said storage element, a plurality of pick-up heads alined with respective ones of said tracks for reproducing said signals, and means for oscillating said heads out-of-phase with one another at the same frequency in the direction of motion of said element for varying the time relations of the reproduced signals.

9. Scanning apparatus as defined in claim 8, wherein the spacing between each of said heads and said element varies as said element oscillates for varying the relative amplitudes of the reproduced signals.

10. Scanning apparatus for sonar systems and the like, comprising a multi-channel magnetic recorder having a rotating magnetic drum, a plurality of recording heads for recording a plurality of signals in individual side-by-side recording tracks on the surface of said drum, a plurality of pick-up heads associated with respective ones of said tracks for individually reproducing said signals, each of said heads being pivoted for arcuate oscillatory motion in the circumferential direction of said drum, the axis of said arcuate motion being non-coincident with the axis of said drum so that the spacing of each pick-up head from the drum surface varies as that head oscillates, and means for oscillating said pick-up heads out-of-phase with one another for varying the time and amplitude relations of the reproduced signals.

11. Scanning apparatus as defined in claim 10, wherein said arcuate motion of each pick-up head is such that the head is closest to said drum at the extremity of said motion in the direction of drum surface movement.

12. Scanning apparatus for sonar systems and the like, comprising a multi-channel magnetic recorder having a rotating magnetic drum, a plurality of recording heads for recording a plurality of signals in individual side-by-side recording tracks on the surface of said drum, a plurality of pick-up heads associated with respective ones of said tracks for individually reproducing said signals, each of said heads being mounted on an arm pivoted for oscillatory motion about a pivot axis that is substantially parallel to the axis of said drum and is separated therefrom by a distance greater than the radius of said drum, a rotative cam shaft, and a plurality of similar cams mounted on said cam shaft in different angular positions, said cams engaging respective ones of said arms, so that said pick-up heads are oscillated out-of-phase with one another as said cam shaft rotates.

13. Scanning apparatus as defined in claim 12, wherein the distance between said cams and said pivot axis is greater than the distance between said pick-up heads and said pivot axis.

14. Scanning apparatus as defined in claim 12, having a motor for rotating said cam shaft at substantially constant speed.

15. Scanning apparatus as defined in claim 12, having means for selectively adjusting the angular position of said cam shaft.

16. Sonar apparatus comprising means for supplying an electric signal responsive to received sonic waves traveling in a selected scanning direction, scanning means for providing periodic variations in said scanning direction, signal-transmitting means connected as a closed loop for carrying a repetitively circulating signal having a circulation time substantially equal to the period of said variations in scanning direction, and means for adding said electric signal to said circulating signal during a plurality of said periodic variations.

References Cited in the file of this patent

UNITED STATES PATENTS

| | | |
|---|---|---|
| 2,418,136 | Munson | Apr. 1, 1947 |
| 2,424,773 | Rieber | July 29, 1947 |
| 2,434,644 | Fairweather | Jan. 20, 1948 |
| 2,487,995 | Tucker | Nov. 15, 1949 |
| 2,533,499 | Munson | Dec. 12, 1950 |
| 2,684,468 | McClure | July 20, 1954 |
| 2,688,154 | Doty | Aug. 31, 1954 |
| 2,779,428 | Silverman | Jan. 29, 1957 |
| 2,800,654 | De Rosa | July 23, 1957 |